(12) United States Patent
Luo et al.

(10) Patent No.: US 11,755,408 B2
(45) Date of Patent: *Sep. 12, 2023

(54) SYSTEMS FOR ESTIMATING BIT ERROR RATE (BER) OF ENCODED DATA USING NEURAL NETWORKS

(71) Applicant: Micron Technology, Inc., Boise, ID (US)

(72) Inventors: Fa-Long Luo, San Jose, CA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,703

(22) Filed: Oct. 7, 2021

(65) Prior Publication Data
US 2023/0115877 A1    Apr. 13, 2023

(51) Int. Cl.
*H03M 13/27* (2006.01)
*H04L 27/34* (2006.01)
(Continued)

(52) U.S. Cl.
CPC ......... *G06F 11/1068* (2013.01); *G06N 3/045* (2023.01)

(58) Field of Classification Search
CPC .................................................. G06N 3/0454
See application file for complete search history.

(56) References Cited

U.S. PATENT DOCUMENTS 7,321,882 B2   1/2008  Jaeger
9,988,090 B2   6/2018  Nishikawa
(Continued)

FOREIGN PATENT DOCUMENTS

KR   20180054554 A   5/2018
KR   20180084988 A   7/2018
(Continued)

OTHER PUBLICATIONS

Sun, Yang, et al., "VLSI Architecture for Layered Decoding of QC-LDPC Codes With High Circulant Weight" IEEE Transactions on Very Large Scale Integration (VLSI) Systems, vol. 21, No. 10, pp. 1960-1964, Oct. 2013.
(Continued)

*Primary Examiner* — Guy J Lamarre
(74) *Attorney, Agent, or Firm* — Dorsey & Whitney LLP

(57) ABSTRACT

Examples described herein utilize multi-layer neural networks, such as multi-layer recurrent neural networks, to estimate a bit error rate (BER) of encoded data based on a retrieved version of encoded data (e.g., data encoded using one or more encoding techniques) from a memory. The neural networks may have nonlinear mapping and distributed processing capabilities which may be advantageous to estimate a BER of encoded data, e.g., to facilitate decoding of the encoded data. In this manner, neural networks described herein may be used to improve or facilitate aspects of decoding at ECC decoders, e.g., by comparing an estimated BER to a threshold (e.g., a threshold BER level) prior to decoding of the encoded data. For example, an additional NN activation indication may be provided, e.g., to indicate that the encoded data may be decoded or to indicate that error present in the encoded data is to be reduced.

21 Claims, 10 Drawing Sheets

(51) Int. Cl.
*H04L 1/00* (2006.01)
*H03M 13/25* (2006.01)
*G06F 11/10* (2006.01)
*G06N 3/045* (2023.01)

(56) References Cited

U.S. PATENT DOCUMENTS

| | | | |
|---|---|---|---|
| 10,176,802 | B1 | 1/2019 | Ladhak et al. |
| 10,400,928 | B2 | 9/2019 | Baldwin et al. |
| 10,491,243 | B2 | 11/2019 | Kumar et al. |
| 10,552,738 | B2 | 2/2020 | Holt et al. |
| 10,698,657 | B2 | 6/2020 | Kang et al. |
| 10,749,594 | B1 | 8/2020 | O'Shea et al. |
| 10,812,449 | B1 | 10/2020 | Cholleton |
| 10,924,152 | B1* | 2/2021 | Luo ............... H04B 7/0851 |
| 11,088,712 | B2 | 8/2021 | Zamir et al. |
| 11,196,992 | B2 | 12/2021 | Huang et al. |
| 11,416,735 | B2 | 8/2022 | Luo et al. |
| 11,424,764 | B2* | 8/2022 | Luo ............... H03M 13/1102 |
| 11,563,449 | B2 | 1/2023 | Luo et al. |
| 2004/0015459 | A1 | 1/2004 | Jaeger |
| 2005/0228845 | A1 | 10/2005 | Pius et al. |
| 2006/0013289 | A1 | 1/2006 | Hwang |
| 2006/0200258 | A1 | 9/2006 | Hoffberg et al. |
| 2009/0106626 | A1 | 4/2009 | Hou et al. |
| 2009/0292537 | A1 | 11/2009 | Ehara et al. |
| 2011/0029756 | A1 | 2/2011 | Biscondi et al. |
| 2017/0177993 | A1 | 6/2017 | Draelos et al. |
| 2017/0310508 | A1 | 10/2017 | Moorti et al. |
| 2017/0370508 | A1 | 12/2017 | Baldwin et al. |
| 2018/0022388 | A1 | 1/2018 | Nishikawa |
| 2018/0046897 | A1 | 2/2018 | Kang et al. |
| 2018/0174050 | A1 | 6/2018 | Holt et al. |
| 2018/0249158 | A1 | 8/2018 | Huang et al. |
| 2018/0322388 | A1 | 11/2018 | O'Shea |
| 2018/0343017 | A1 | 11/2018 | Kumar et al. |
| 2018/0357530 | A1 | 12/2018 | Beery et al. |
| 2019/0197549 | A1 | 6/2019 | Sharma |
| 2020/0012953 | A1 | 1/2020 | Sun et al. |
| 2020/0014408 | A1 | 1/2020 | Kim |
| 2020/0065653 | A1 | 2/2020 | Meier et al. |
| 2020/0160838 | A1 | 5/2020 | Lee |
| 2020/0210816 | A1 | 7/2020 | Luo et al. |
| 2020/0234103 | A1 | 7/2020 | Luo et al. |
| 2020/0296741 | A1 | 9/2020 | Ayala Romero et al. |
| 2020/0356620 | A1 | 11/2020 | Yen et al. |
| 2020/0402591 | A1 | 12/2020 | Xiong et al. |
| 2021/0004208 | A1 | 1/2021 | Lai et al. |
| 2021/0143840 | A1 | 5/2021 | Luo |
| 2021/0273707 | A1 | 9/2021 | Yoo et al. |
| 2021/0287074 | A1 | 9/2021 | Coenen |
| 2021/0304009 | A1 | 9/2021 | Bazarsky et al. |
| 2021/0319286 | A1 | 10/2021 | Gunduz |
| 2021/0336779 | A1 | 10/2021 | Jho et al. |
| 2021/0351863 | A1 | 11/2021 | Gunduz |
| 2022/0019900 | A1* | 1/2022 | Wong ............... G06N 3/0454 |
| 2022/0368349 | A1 | 11/2022 | Luo et al. |
| 2022/0368356 | A1 | 11/2022 | Luo et al. |
| 2022/0399904 | A1 | 12/2022 | Luo |

FOREIGN PATENT DOCUMENTS

| | | | | |
|---|---|---|---|---|
| KR | 20200062322 | * | 6/2020 | ............ H04N 19/11 |
| KR | 20200124504 | A | 11/2020 | |
| WO | 2020131868 | A1 | 6/2020 | |
| WO | 2020139976 | A1 | 7/2020 | |
| WO | 2021096641 | A1 | 5/2021 | |
| WO | 2022232065 | A1 | 11/2022 | |
| WO | 2022232066 | A1 | 11/2022 | |

OTHER PUBLICATIONS

U.S. Appl. No. 16/839,447, titled "Neural Networks and Systems for Decoding Encoded Data", dated Apr. 3, 2020, pp. all.

U.S. Appl. No. 16/683,217, titled "Recurrent Neural Networks and Systems for Decoding Encoded Data", filed Nov. 13, 2019, pp. all.
International Application No. PCT/US19/68616, titled "Neural Networksand Systems for Decoding Encoded Data", filed Dec. 26, 2019, pp. all.
PCT Application PCT/US20/56151 titled "Recurrent Neural Networksand Systems for Decoding Encoded Data" filed Oct. 16, 2020, pp. all.
U.S. Appl. No. 17/302,226, titled "Decoders and Systems for Decoding Encoded Data Using Neural Networks", filed Apr. 27, 2021, pp. all.
U.S. Appl. No. 17/302,228, titled "Systems for Error Reduction of Encoded Data Using Neural Networks", filed Apr. 27, 2021, pp. all.
U.S. Appl. No. 16/233,576 titled "Neural Networks and Systems for Decoding Encoded Data" filed Dec. 27, 2018, pp. all.
Kim, Minhoe et al., "Building Encoder and Decoder With Deep Neural Networks: On the Way to Reality", Retrieved from <https://arxiv.org/abs/1808.02401>, dated Aug. 7, 2018, p. 4-5.
Lipton, Zachary C. et al., "A Critical Review of Recurrent Neural Networks for Sequence Learning", Retrieved from https://arxiv.org/abs/1506.00019v4, Oct. 17, 2015, pp. all.
Huo et al. "A Tutorial and Review on Inter-Layer FEC Coded Layered Video Streaming" in IEEE Communications Survey & Tutorials, vol. 17, No. 2, 2nd Quarter 2015; pp. 1166-1207.
U.S. Appl. No. 17/821,391, titled, "Recurrent Neural Networks and Systems for Decoding Encoded Data," filed Aug. 22, 2022, pp. all pages of application as filed.
Cao, Congzhe, et al., "Deep Learning-Based Decoding of Constrained Sequence Codes", Retrieved from URL: https://arxiv.org/pdf/1906.06172, Jun. 2019, 13 pages.
Huang, Kunping, et al., "Functional Error Correction for Robust Neural Networks", Retrieved from URL: https://arxiv.org/pdf/2001.03814, Jan. 2020, 24 pages.
International Search Report and Written Opinion for International Application No. PCT/US2022/045432 dated Jan. 26, 2023; pp. all.
Navneet Agrawal "Machine Intelligence in Decoding of Forward Error Correction Codes"; Degree Project in Information and Communication Technology; KTH Royal Institute of Technology, School of Electrical Engineering; Sweeden Oct. 2017; pp. all.
U.S. Appl. No. 18/158,332, filed Jan. 23, 2023, titled, "Systems for Error Reduction of Encoded Data Using Neural Networks,"; pp. all pages of application as filed.
I. Wodiany and A. Pop "Low-Precision Neural Network Decoding of Polar Codes", 2019 IEEE 20th International Workshop on Signal Processing Advances in Wireless Communications (SPAWC), Cannes, FR; Jul. 2019 pp. all.
U.S. Appl. No. 18/179,317, filed Mar. 6, 2023 and titled, "Neural Networks and Systems for Decoding Encoded Data,"; pp. all pages of application as filed.
Chang, Andre, et al., "Hardware Accelerators for Recurrent Neural Networks on FPGA", IEEE International Symposium on Circuits and Systems (ISCAS), 4 pgs, May 2017.
Kim, Minhoe, et al., "Toward the Realization of Encoder and Decoder Using Deep Neural Networks", IEEE Communications Magazine, vol. 57, No. 5, 7 pages, May 2019.
Nachmani, Eliya, et al., "RNN Decoding of Linear Block Codes", ARXIV.ORG, Cornell University Library, 7 pgs, Feb. 2017.
Payani, Ali, et al., "Decoding LDPC Codes on Binary Erasure Channels Using Deep Recurrent Neural-Logic Layers", IEEE 10th International Symposium on Turbo Codes & Iterative Information Processing, 5 pgs, Dec. 2018.
Sandoval Ruiz, Cecilia, "FPGA Prototyping of Neuro-Adaptive Decoder", Advances in Computational Intelligence, Man-Machine Systems and Cybernetics, 6 pgs, Dec. 2010.
Soltani, Rohollah, et al., "Higher Order Recurrent Neural Networks", Retrieved May 31, 2023 from: https://arxiv.org/pdf/1605.00064.pdf, 9 pgs.
Teng, Chieh-Fang, et al., "Low-Complexity Recurrent Neural Network-Based Polar Decoder With Weight Quantization Mechanism", ARXIV.ORG, Cornell University Library, 5 pgs, Oct. 2018.

* cited by examiner

US 11,755,408 B2

SYSTEMS FOR ESTIMATING BIT ERROR RATE (BER) OF ENCODED DATA USING NEURAL NETWORKS

TECHNICAL FIELD

Examples described herein relate to neural networks, including recurrent neural networks, for use in decoding encoded data. Examples of neural networks are described which may be used with error-correction coding (ECC), where a neural network may be used to facilitate decoding of encoded data by estimating a bit error rate (BER) of the encoded data.

BACKGROUND

Error correction coding (ECC) may be used in a variety of applications, such as memory devices or wireless baseband circuitry. Generally, error correction coding techniques may encode original data with additional bits to describe the original bits which are intended to be stored, retrieved, and/or transmitted. The additional bits may be stored together with the original bits. Accordingly, there may be L bits of original data to be stored and/or transmitted. An encoder may provide N-L additional bits, such that the encoded data may be N bits worth of data. The original bits may be stored as the original bits, or may be changed by the encoder to form the encoded N bits of stored data. A decoder may decode the N bits to retrieve and/or estimate the original L bits, which may be corrected in some examples in accordance with the ECC technique.

Additionally, memory devices may operate with complex error correction techniques whose area and power needs are rising; resulting in higher cost silicon and longer firmware development times. For example, some aspects of decoding encoded data may impose additional area and power needs on a memory device.

Bit flips (e.g., a change in charge at a memory cell) may occur in non-volatile memory devices. Bit flips of encoded data (e.g., bits of encoded data stored in degraded memory cells) introduce noise to the encoded data, thereby introducing errors in the encoded data.

DETAILED DESCRIPTION

Figure 1A:
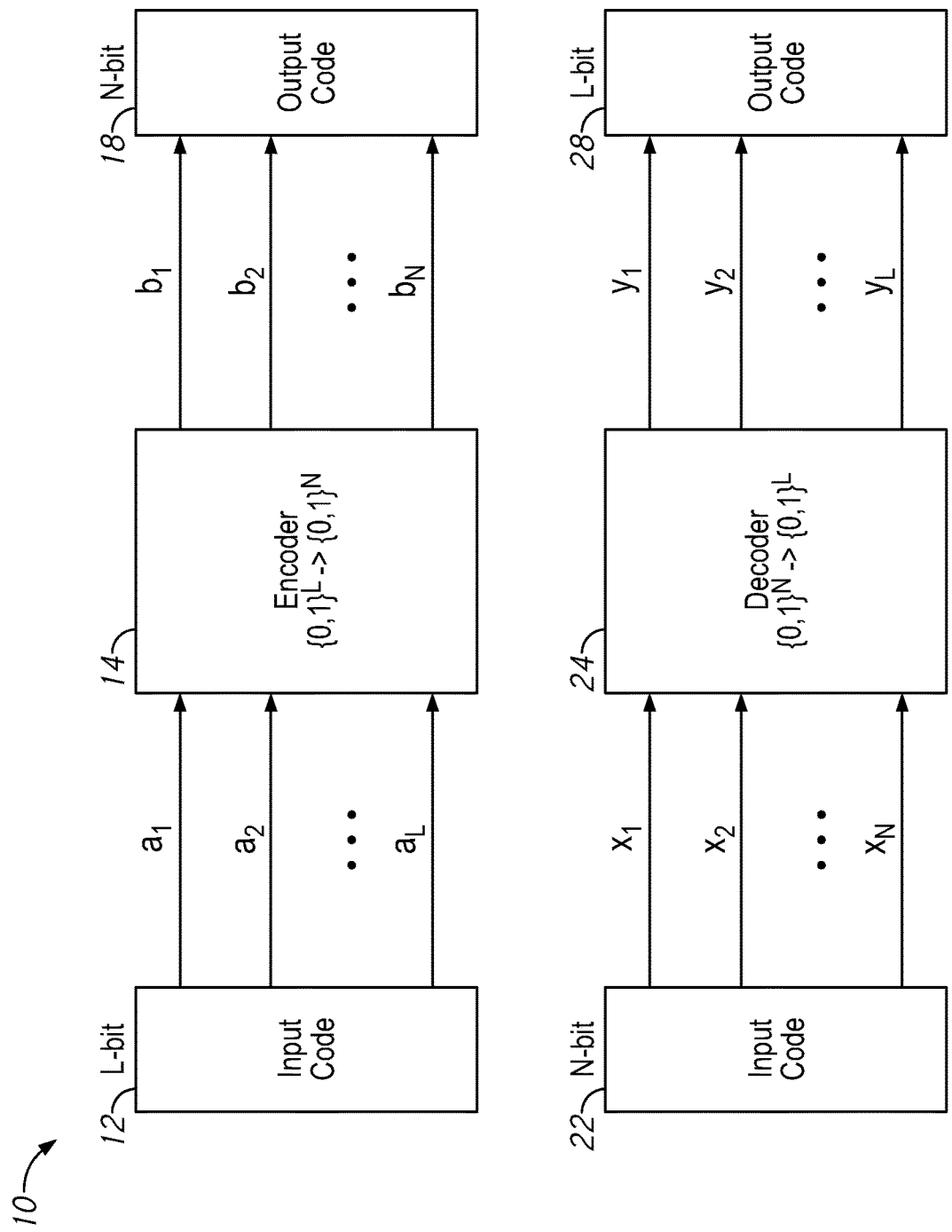
FIG. 1A is a schematic illustration of an ECC system arranged in accordance with examples described herein.

Multi-layer neural networks and/or multi-layer recurrent neural networks may be used to decode encoded data (e.g., data encoded using one or more encoding techniques). Such neural networks may have nonlinear mapping and distributed processing capabilities which may be advantageous in many systems employing the neural network decoders. In the examples described herein, neural networks (NNs) (e.g., such as recurrent neural networks (RNNs)) may be trained to estimate a bit error rate (BER) of encoded data. A BER output by a NN may be an estimate of the BER of encoded data retrieved from memory or encoded data after transmission of that encoded data from the output of an encoder to the NN. For example, the encoded data retrieved from memory may include errors (e.g., error introduced by bit flips that occurred during the reading process). Advantageously, by estimating a BER of the encoded data, systems described herein may facilitate decoding when comparing the estimated BER to a threshold (e.g., a threshold BER level), prior to decoding of the encoded data. For example, if the estimated BER does not compare favorably with a threshold (e.g., if the estimated BER exceeds a threshold BER), techniques may be employed to reduce the error in the encoded data. If, on the other hand, the estimated BER is compared favorably with the threshold, the encoded data may be suitable for decoding. Systems described herein may accordingly provide an indication (e.g., a signal) whether the encoded data may or may not be decoded (e.g., whether the BER exceeds a threshold or not).

Encoded data may be generated by an encoder that utilizes an encoding technique. As disclosed herein, the NN may be associated with (e.g., specific to) that encoding technique. For example, an estimated BER of the encoded data may be provided by the NN that is associated with a particular encoding technique. For example, the NN may be trained to determine parameters (e.g., weights) for use by the NN to perform a particular mapping between input encoded data and output an estimate of the BER of that input encoded data. The NN may be trained on known encoded data including known codewords and known BERs, such that the NN is trained particular to an encoding technique. Varying encoding techniques may have individual characteristics, such as a code rate, redundant bits, or the like. For example, a particular encoding technique may be trained based on its respective code rate, which may have a particular ratio of encoded N bits of stored data to original L bits.

The known codewords may include known bit errors, which may simulate noise that may be introduced when storing the encoded data in degraded memory and/or when reading the data out of the memory. As an example, in some non-volatile memory devices, bit flips may degrade memory storage capabilities. Accordingly, a NN that estimates the BER of encoded data may facilitate decoding of encoded data, e.g., by recognizing noise present in the encoded data. Once recognized, systems disclosed herein may provide an additional NN activation indication to indicate that decoding of the encoded data may be performed or that another NN may perform an error reduction technique to the encoded data (e.g., if the estimated BER does not pass a threshold).

There are a variety of particular error correction coding techniques which may be used in accordance with examples described herein, including low density parity check coding (LDPC), Reed-Solomon coding, Bose-Chaudhuri-Hocquenghem (BCH), and polar coding. The use of these coding techniques, however, may come at the cost of the decrease of the frequency and/or channel and/or storage resource usage efficiency and the increase of the processing complexity. For example, the use of coding techniques may increase the amount of data which may be stored and/or communicated (e.g., within a memory system). Frequently storing and/or transmitting encoded data may increase errors present in the encoded data. Errors present in encoded data may be referred to as error bits because one or more bits may be changed in a version of encoded data when at least a portion of a stored version of encoded data experiences noise. For example, a stored version of encoded data may include error bits when provided to a decoder, because the stored version of encoded data may be subjugated to noise distortions during storage (e.g., bit flips) or may experience noise during communication (e.g., to/from memory for storage, or to a decoder). Accordingly, there may be a need to reduce errors (e.g., error bits) in versions of encoded data, to facilitate decoding of the encoded data. To determine whether there is a need to reduce errors, systems described herein provide for a BER to be estimated, e.g., of a stored version of encoded data. Once estimated, the BER of the stored version of encoded data may be compared to a threshold, e.g., a number of errors that the system may tolerate for decoding, such as a threshold BER level.

Advantageously, estimating a BER of encoded data prior to decoding of that encoded data may improve processing speed (e.g., time to decode encoded data) or reduce computational/power resources used for decoding. Accordingly, there is a need to provide a NN that estimates the BER of encoded data, to reduce semiconductor area and/or power needs in electronic devices using encoders and/or decoders.

FIG. 1A is a schematic illustration of an ECC system arranged in accordance with examples described herein. In the ECC system 10, an encoder 14 may receive L bits of input data (a1, a2, ... aL) 12. Any number of bits may be used as L. As part of ECC system 10, the encoder 14 may encode the input data in accordance with an encoding technique to provide N bits of encoded data as output code (b1, b2, ... bN) 18. Any number of bits may be used as N—generally N may be greater than L. For example, as depicted in FIG. 1A, an encoder 14 may receive an L set of input data bits {0,1} and may encode the L bits into an N set of encoded data {0,1}. In some implementations, the encoded data may be stored and/or transmitted, or some other action taken with the encoded data, which may introduce noise (such as errors) into the data. For example, during transmission or communication of encoded data in an electronic device implementation of ECC system 10, the encoded data, which is communicated as a signal in the ECC system 10, may experience noise due to voltage or current disturbances in the electronic device.

Continuing with reference to the ECC system 10 of FIG. 1A, a decoder 24 may receive a version of the N bits of encoded data (x1, x2, ... xN) as input code data 22. The N bits of encoded data (x1, x2, ... xN) may correspond to the N bits of encoded data (b1, b2, ... bN) output by the encoder, but with errors being introduced. The errors may be introduced by storage and/or retrieval from memory and/or transmission to the decoder. For example, during transmission from a memory to a decoder in ECC system 10, the encoded data may experience noise on a bus coupling the memory to the decoder, e.g., due to voltage or current disturbances on the bus. The decoder 24 may decode the input code data 22 into an estimate of the L bits original data (a1, a2, ... aL) as output data 28 (y1, y2, ... yL). For example, as depicted in FIG. 1A, a decoder 24 may receive an N set of input encoded data bits {0,1} to decode the N bits as an L set of decoded data {0,1}.

Examples of memory devices or wireless baseband circuitry may utilize error correction coding (such as low density parity check coding, LDPC). An encoder 14 may add particularly selected N-L bits into an original data of L bits, which may allow a decoder 24 to decode the data and reduce and/or minimize errors introduced by noise, interferences and/or other practical factors in the data storage and transmission.

Examples described herein utilize neural networks (NNs), such as multi-layer neural networks and/or multi-layer recurrent neural networks (RNNs) to estimate any error present or introduced in the N bits of encoded data (x1, x2, ... xN); such that the NNs provide an estimate of a BER of the encoded data. The BER of encoded data, output by a NN, is an estimate of the error introduced into the N bits of encoded data (b1, b2, ... bN) output by the encoder 14, e.g., once those N bits of encoded data are stored in memory or transmitted through a medium that introduces noise. For example, the BER of the encoded data, provided as an estimate of (e.g., equivalent to) bit error rate in the encoded data (x1, x2, ... xN) by a NN, may correspond to a respective BER of encoded data retrieved from memory. The NN utilized to process the encoded data including error (e.g., including at least one error bit) may be trained to transform retrieved encoded data to an estimate of a BER of encoded data. Accordingly, in example implementations described herein, NNs may estimate of a BER of encoded data, to facilitate providing the encoded data to a decoder for decoding. Once a BER estimate is obtained, systems disclosed herein (e.g., as described with respect to FIGS. 4 and 5 below) may provide an indication that decoding of the encoded data may be performed (e.g., if the estimated BER passes the threshold) or that another NN may perform an error reduction technique to the encoded data (e.g., if the estimated BER does not pass a threshold).

Figure 1B:
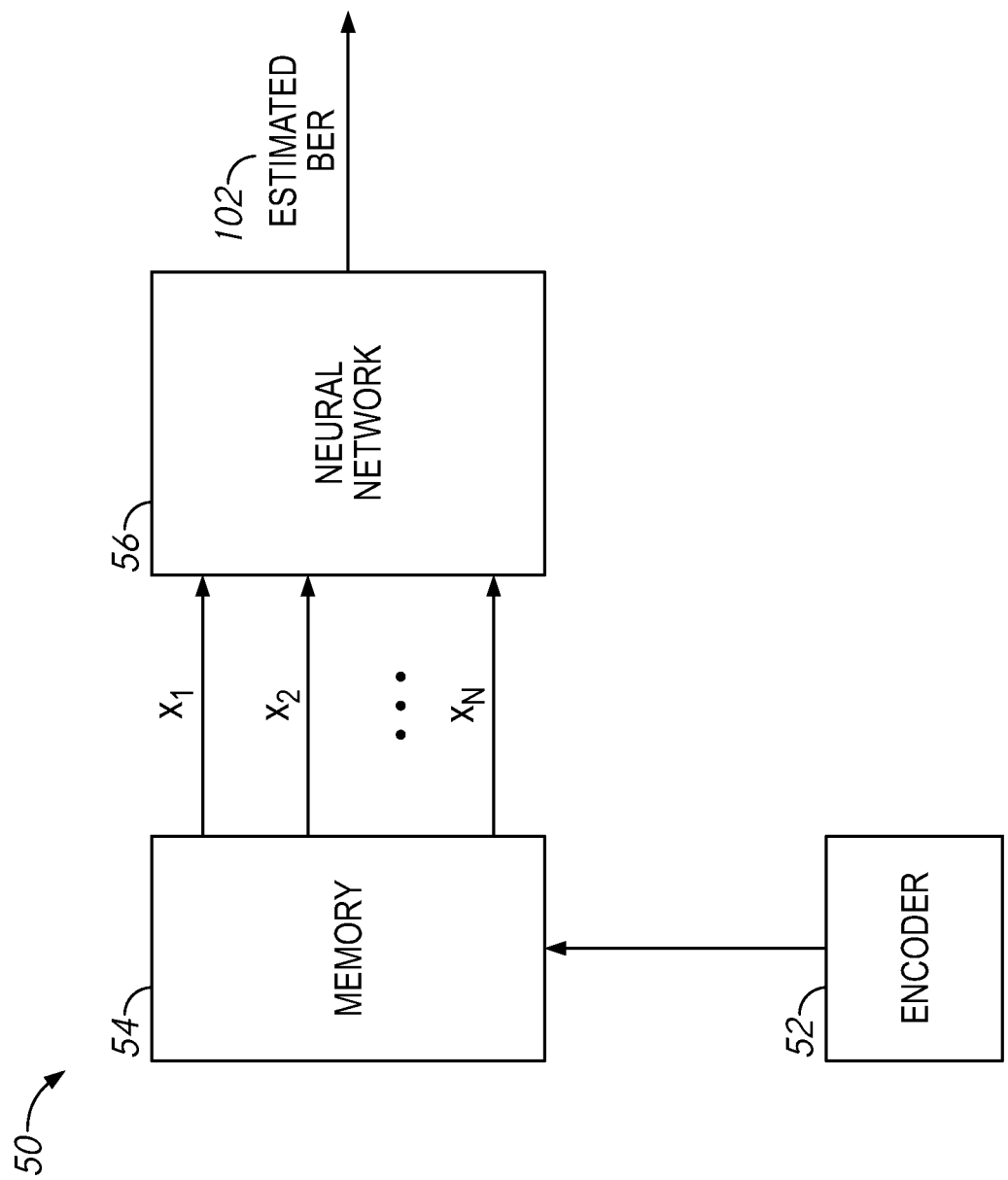
FIG. 1B is a schematic illustration of an example of a memory system arranged in accordance with examples described herein.

FIG. 1B is a schematic illustration of an example of a memory system 50 arranged in accordance with examples described herein. The memory system 50 includes encoder 52 coupled to a memory 54 (e.g., a memory device). The encoder 52 may provide encoded data to the memory 54 for storage and/or may transmit, via the memory 54, the encoded data to the neural network (NN) 56. For example, the encoder 52 may implement the encoder 14 to output N bits of encoded data (b1, b2, ... bN). The encoded data may be any encoded data that is encoded in accordance with an encoding technique, e.g., any error correction coding techniques, including LDPC coding, Reed-Solomon coding, BCH coding, or polar coding. Accordingly, the encoder 52 may be an ECC encoder for any type of ECC coding.

The memory 54 may provide the N bits of encoded data (x1, x2, ... xN) to the NN 56. In the example, the N bits of encoded data (x1, x2, ... xN), output by the memory 54, are representative of the N bits of encoded data (b1, b2, ... bN) output by the encoder 52, but with errors being introduced. For example, during transmission from the memory 54 to the NN 56, the encoded data may experience noise on the bus coupling the memory 54 to the encoder 52, e.g., due to voltage or current disturbances on the bus. As another example, the encoded data may experience noise on the memory buses coupling the memory 54 to the NN 56, e.g., due to voltage or current disturbances on those memory buses.

Additionally or alternatively, storing N bits of encoded data (b1, b2, ... bN) in memory 54 may introduce environmental or other noise. Accordingly, noise may be introduced in storing the encoded data in memory 54 that is degraded (e.g., due to bit flips). Accordingly, encoded data retrieved from the memory 54 may be referred to as a stored version of encoded data, which may include errors present in that stored version of encoded data. For example, the errors may be error bits due to certain bits of the encoded data being flipped when stored in the memory 54. Thus, error being present in the encoded data whether by transmission or storage or other reason, the NN 56 receives N bits of encoded data as the encoded data (x1, x2, . . . xN).

The memory system 50 may further include the NN 56 that estimates a BER 102 of encoded data based on the received version of encoded data (x1, x2, . . . xN). This received version of encoded data, retrieved from the memory 54, may be referred to as a stored version of encoded data. In the example, the NN 56 receives the N bits of encoded data (x1, x2, . . . xN). Accordingly, the NN 56 may receive encoded data which includes error present, e.g., by storing in and/or transmitting via memory 54 the N bits of encoded data (b1, b2, . . . bN). The NN 56 be implemented using any type of neural network, including examples of recurrent neural networks described herein. Generally, neural networks described herein may be implemented using one or more processor(s) and memory encoded with instructions which, when executed by the processor(s), implement the neural network. The neural network may be trained, e.g., weights and/or connections for the neural network may be determined. The weights and/or connections determined during training may be stored (e.g., in a same or different memory used to store instructions for implementing the neural network).

In the example, based on the stored version of encoded data received and weights acquired during a training process of the NN 56, the NN 56 may estimate the BER of the encoded data (x1, x2, . . . xN). Thus, the NN 56 may generate an estimated BER 102 of the N bits of encoded data (x1, x2, . . . xN). For example, the estimated BER may be equivalent to a calculated BER of output from the encoder 52 and/or a calculated BER of N bits of encoded data once retrieved from memory 54. A calculated BER may include a calculation of a ratio of error bits to non-error bits in the N bits of encoded data (e.g., using known codewords) and/or a comparison of the known L bits of input data (a1, a2, . . . aL) to an output of decoded data. For example, a number of errors in known output data 28 (y1, y2, . . . yL) may be counted to calculate a BER of the known L bits of input data (a1, a2, . . . aL) for the memory 54 in operation. As such and additionally, the estimated BER may be equivalent to a bit error rate of the memory 54 in operation. For example, the memory 54 may include a certain number of degraded cells that the estimated BER represents as an error rate of the memory 54 for any encoded data stored thereon. Accordingly, the NN 56 may estimate a BER calculation using the N bits of encoded data (x1, x2, . . . xN). In this manner, the memory system 50 may implement the NN 56, to estimate BERs of stored versions of encoded data; the NN 56 having been trained to receive encoded data and output an estimated BER 102 of the encoded data. In some examples, the neural network may be trained on data using a particular encoding technique (e.g., the neural network may be particular to an encoding technique).

The NN 56 may be trained to determine parameters (e.g., weights) for use by the NN 56 to perform a particular mapping between input encoded data and output an estimated BER of encoded data. For example, training the NN 56 may include providing one set of parameters (e.g., weights) to use when estimating error present in encoded data (e.g., due to storage or transmission thereof) that had been encoded with a particular encoding technique (e.g., low density parity check coding (LDPC), Reed-Solomon coding, Bose-Chaudhuri-Hocquenghem (BCH), and/or Polar coding). In various examples, the training of the NN 56 may vary according to or particular to different encoding techniques, such that different sets of parameters are trained for each encoding technique. For example, the NN 56 may be trained multiple times and/or may use weights determined from multiple trainings, using different known codewords including at least one error bit and known BERs, for example. For example, known encoded data may include known codewords having a particular coding rate, in addition to known error bits introduced into particular codewords.

Multiple trainings may result in multiple sets of connection weights. For example, a different set of weights may be determined for each of multiple encoding techniques—e.g., one set of weights may be determined for use with estimating a BER of LDPC encoded data and another set of weights may be determined for use with estimating a BER of BCH encoded data. Accordingly, in various implementations, the various sets of weights may correspond to weights used to estimate a BER of encoded data based on a received version of encoded data. In the example, the known codewords used in training neural networks described herein may corresponds to data that was retrieved in a similar manner as to how data may be provided to a NN that estimates a BER (e.g., NN 56). For example, the known codewords, which may be referred to as known-errored encoded data, may be data that was retrieved from the memory 54 having known memory defects (e.g., N bits of encoded data (x1, x2, . . . xN)). Using the known-errored encoded data, an NN may be trained on data, such that the NN 56 may also use the same memory 54 having memory defects, to estimate the BER of retrieved versions of encoded data, once trained. Training as described herein may be supervised or un-supervised in various examples. In some examples, training may occur using known pairs of anticipated input and desired output data. For example, training may utilize known encoded data and known errored-encoded data pairs to train a neural network to transform subsequent encoded data into a BER of encoded data. Examples of training may include determining weights to be used by a neural network, such as neural network 170 of FIG. 1D. In some examples, the same neural network hardware is used during training as will be used during operation. In some examples, however, different neural network hardware may be used during training, and the weights, functions, or other attributes determined during training may be stored for use by other neural network hardware during operation.

While described in the specific context of FIG. 1B, generally described, a memory system 50 may include any number of circuitries or components to implement aspects of the memory system 50, which generally operates to estimate a BER 102 of encoded data.

Figure 1C:
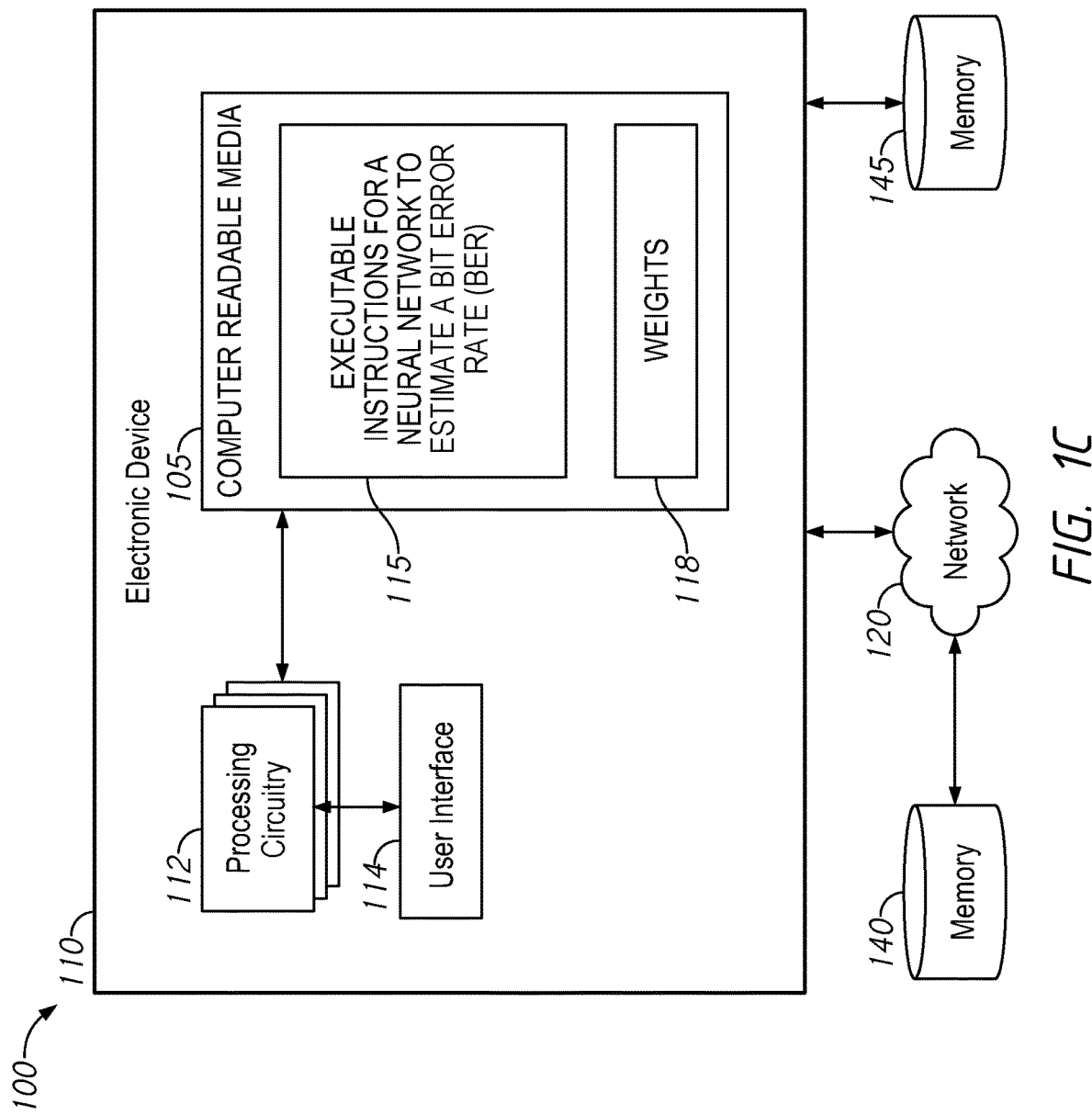
FIG. 1C is a schematic illustration of a computing system arranged in accordance with examples described herein.

FIG. 1C is a schematic illustration of an electronic device 110 arranged in a system 100 in accordance with examples described herein. The electronic device 110 may be coupled to a memory 140 via network 120 and/or may be coupled to and/or include memory 145, each of which may store coefficient data. For example, the coefficient data may be weights for a neural network or a recurrent neural network. Coefficient data stored in the memory 140 or memory 145 may include coefficient data which may be mixed with encoded data received by the electronic device 110 in examples described herein. For example, coefficients may be specific to a bit error rate (BER) estimation for codewords associated with the encoded technique. The encoded data may also be stored in the memory 140 or 145. The electronic device 110 may obtain the encoded data (e.g., N encoded input bits) from the memory 140 or memory 145 to decode the data to be output as decoded output data.

Electronic device 110 also includes processing circuitry 112 that may interact with computer readable media 105, which may be encoded with instructions executable by the processing circuitry 112, e.g., the executable instructions 115. In some implementations, computer readable media 105 may be implemented as a memory, which may include both storage media and communication media. Example computer readable media 105 may include volatile and nonvolatile, removable and non-removable media implemented in any method or technology for storage of information, such as computer readable instructions. The computer readable media 105 includes, stored therein, the executable instructions 115 for a neural network to estimate a BER of encoded data (e.g., an estimated BER 102 from NN 56) based on the received version of encoded data (x1, x2, . . . xN). For example, the executable instructions 115 may include instructions to select certain coefficient data (e.g., from memory 140 or memory 145) and to store the coefficient data as weights in weights memory 118 of the computer readable media 105. The executable instructions 115 may further include instructions to provide those weights 118 to one or more of the multiplication/accumulation units and/or memory look-up units of FIG. 2 whose details will be presented after describing FIGS. 1C-1D. As used herein, the weights 118 may be referred to as a plurality of coefficients or pluralities of coefficients (e.g., coefficient data). In some examples, the weights 118 stored in the computer readable media 105 may be used by a neural network implemented using the processing circuitry 112 (e.g., NN 56) to facilitate decoding of encoded data that is associated with a particular encoding technique, e.g., by estimating error present in the encoded data due to storage or transmission thereof. The processing circuitry 112 may be referred to as a processing resource, in some examples. The executable instructions 115 may include instructions to select certain coefficient data as weights 118 based on an indicated encoding technique, e.g., to estimate a BER for codewords associated with that encoding technique. For example, header information or another flag associated with encoded data (e.g., obtained from memory 140 or 145) may indicate weights associated with (e.g., trained according to) a particular encoding technique. In the example, the executable instructions 115 may be executed to store certain weights 118 from the memory 140 or memory 145. Additionally, the executable instructions 115 may be executed to facilitate decoding of encoded data into decoded data when the weights 118 are used by processing circuitry 112 implementing a neural network to estimate a BER of encoded data based on a version of encoded data received at a NN (e.g., a stored version of encoded data retrieved from a memory).

The processing circuitry 112 may be used to implement a NN (e.g., NN 56). The processing circuitry 112 may be implemented using one or more processors, for example, having any number of cores. In some examples, the processing circuitry 112 may include custom circuitry (e.g., one or more field programmable gate arrays, and/or application-specific integrated circuits), and/or firmware for performing functions described herein. The processing circuitry 112 can include multiplication unit/accumulation units for performing the described functions, as described herein, e.g., for a neural network to estimate a BER of encoded data, e.g., based on a received version of encoded data. Processing circuitry 112 can be implemented in some examples using a microprocessor or a digital signal processor (DSP), or any combination thereof. In some examples, processing circuitry 112 can include levels of caching, such as a level one cache and a level two cache, a core, and registers. An example processor core can include an arithmetic logic unit (ALU), a bit manipulation unit, a multiplication unit, an accumulation unit, an adder unit, a look-up table unit, a memory look-up unit, or any combination thereof. An example of processing circuitry 112 is described herein, for example with reference to FIG. 2.

The computer readable media 105 may be encoded with executable instructions 115 for a neural network to estimate a BER of encoded data at the processing circuitry 112. For example, in the context of decoding encoded data from memory 140 or 145, the executable instructions 115 for a neural network to estimate a BER of encoded data may include instructions for receiving the encoded data from the memory 140 or 145; and to transform that received encoded data at the processing circuitry 112 into a BER of the encoded data, e.g., by estimating a BER of encoded data at a NN 56. For example, the executable instructions 115 may include instructions for receiving a stored version of encoded data, retrieved from the memory 140 via a network 120 or memory 145 (e.g., a stored version of encoded data). The stored version of encoded data may be representative of N bits of encoded data (e.g., x1, x2, . . . xN). The stored version of encoded data may include error(s), such as errors introduced, e.g., by storing in and/or transmitting via memory 140 or 145 the N bits of encoded data (b1, b2, . . . bN).

The executable instructions 115 for a neural network to estimate a BER of encoded data may further include instructions for multiplying a portion of the received version of encoded data with coefficient data (e.g., the weights 118) to generate a coefficient multiplication result and accumulating the coefficient multiplication result to be further multiplied and accumulated with another portion of the encoded data and coefficient data, examples of which are described herein. For example, to generate a coefficient multiplication result, a first layer of multiplication/accumulation processing units (MAC units) may calculate the received version of encoded data with the plurality of coefficients to generate such coefficient multiplication results, or first processing results of the first layer of MAC units. Continuing in the example, to provide the output data, additional layers of MAC units may combine the first processing results with additional pluralities of coefficients to generate additional coefficient multiplication results, or second processing results of the additional layers of MAC units. The MLUs of a last layer of the additional layers of MAC units may provide the estimate of the bit error rate of encoded data based on the second processing results. Accordingly, the executable instructions 115 for a neural network to estimate a BER of encoded data may include various sets of executable instructions for different types of hardware implementations, such as those shown in FIG. 2, to implement such computing of a received version of encoded data with coefficient data (e.g., the weights 118).

The user interface 114 may be implemented with any of a number of input devices including, but not limited to, a touchscreen, keyboard, mouse, microphone, or combinations thereof. The user interface 114 may receive input from a user, for example, regarding decoding certain encoded data at the processing circuitry 112. The user interface 114 may communicate the user input to the computer readable media 105 and/or the processing circuitry 112. Example user interfaces 114 include a serial interface controller or a parallel interface controller, which may be configured to communicate with external input devices (e.g., keyboard, mouse, pen, voice input device, touch input device, etc.).

The network 120 may include a wired network or direct-wired connection, and wireless media such as acoustic, radio frequency (RF), microwave, infrared (IR) and other wireless media.

The memory(s) 140, and 145 (or computer readable media 105, if being implemented as a memory) may be implemented using any storage medium accessible to the processing circuitry 112. For example, RAM, ROM, solid state memory, flash memory, disk drives, system memory, optical storage, or combinations thereof, may be used to implement the computer readable media 105 or memory(s) 140, and 145. In storing encoded data in memories 140 or 145, environmental or other noise may be introduced in the storing process. For example, noise may be introduced in storing the encoded data in memory 140 or 145 that is degraded (e.g., due to bit flips). Accordingly, encoded data received from the memory(s) 140 or 145 may be referred to as noisy encoded data or encoded data including at least one error bit. In some implementations, the computer readable media 105 may store associations between coefficients and particular encoding techniques described herein, e.g., such that the executable instructions 115 may utilize the associations to select certain coefficient data in memories 140 or 145 as the weights 118.

The electronic device 110 may be implemented using any of a variety of computing systems, including but not limited to one or more desktop, server, laptop, or other computers. The electronic device 110 generally includes processing circuitry 112. The computing system 100 may be implemented as a mobile communication device using any user communication device, including but not limited to, a desktop, laptop, cellular phone, tablet, appliance, automobile, or combinations thereof. The electronic device 110 may be programmed with an application (e.g., may include processing circuitry 112 and computer readable media 105 encoded with instructions 115 which, when executed, cause the electronic device 110 to perform described functions) for a neural network to estimate a BER of encoded data. For example, the electronic device 110 may be programmed to receive an indication from a touchscreen of a mobile communication device that certain encoded data is to be decoded by first passing the received version of encoded data through a NN (e.g., NN 56) implemented at the processing circuitry 112. Advantageously, a NN may facilitate decoding of encoded data received, e.g., by estimating noise present in the encoded data.

It is to be understood that the arrangement of computing systems of the system 100 may be quite flexible, and although not shown, it is to be understood that the system 100 may include many electronic devices 110, which may be connected via the network 120 can operate in conjunction with each other to perform the systems and methods described herein. The memory 145 and/or the memory 140 may in some examples be implemented using the same media, and in other examples may be implemented using different media. For example, while the memory 140 is shown in FIG. 1C as coupled to the network 120, it can be appreciated that the memory 140 may also be implemented electronic device 110 as part of the computer readable media 105. Additionally, while a single user interface 114 is shown in FIG. 1C, it can be appreciated that the electronic device 110 may further include any number of input devices, output devices, and/or peripheral components. For example, the user interface 114 may be the interface of a mobile communication device.

Figure 1D:
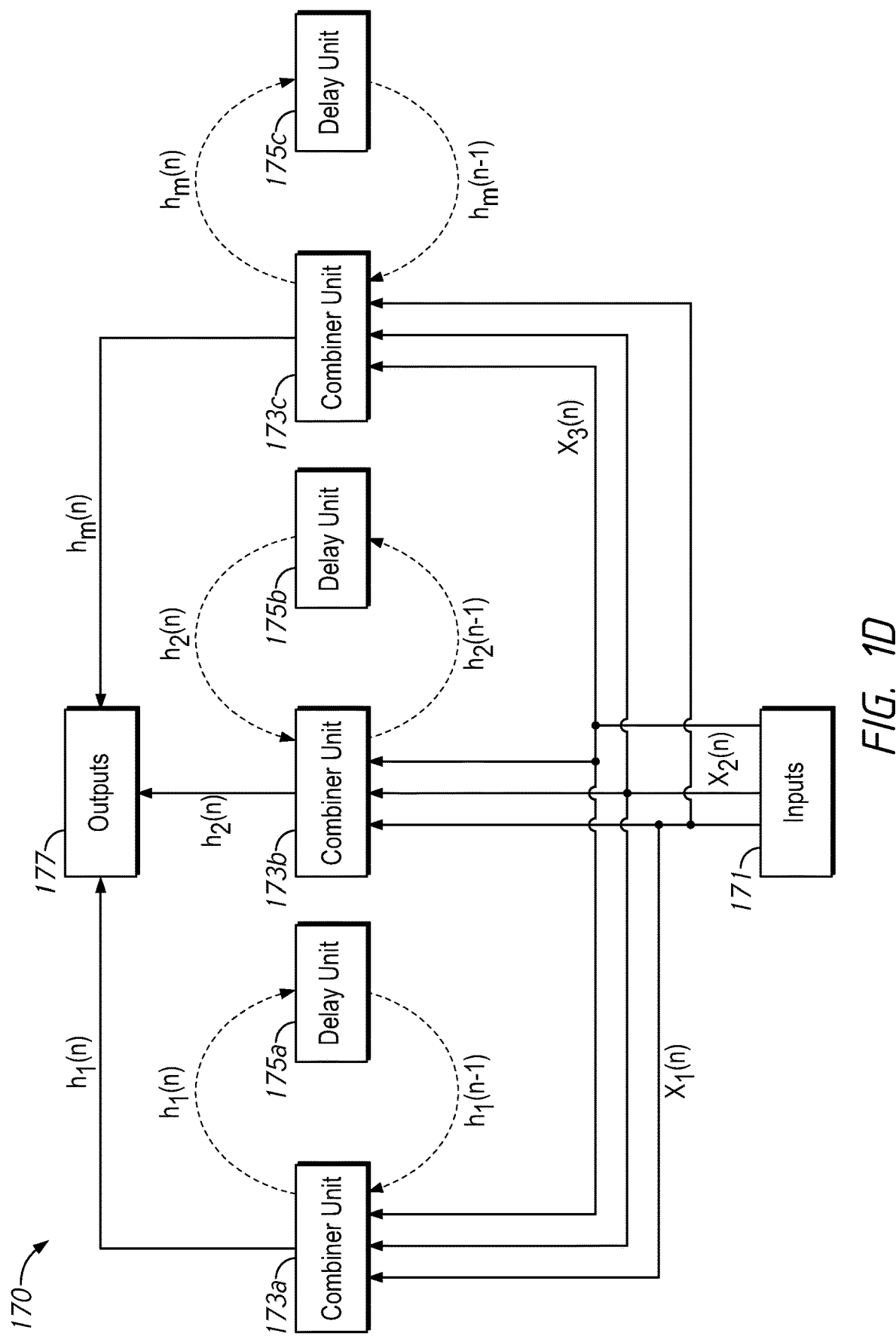
FIG. 1D is a schematic illustration of a recurrent neural network arranged in accordance with examples described herein.

FIG. 1D is a schematic illustration of a recurrent neural network arranged in accordance with examples described herein. The neural network 170 includes three stages (e.g., layers): an inputs node 171; a combiner stage 173 and 175, and an outputs node 177. While three stages are shown in FIG. 1D, any number of stages may be used in other examples. Details of an example implementation of neural network 170, in the context of FIG. 2, will be presented in the description of FIG. 2. In some implementations, the neural network 170 may have multiple combiner stages such that outputs from one combiner stage is provided to another combiners stage, until being providing to an outputs node 177; for example, there may be multiple combiner stages in a neural network 170. As depicted in FIG. 1D, the delay units 175a, 175b, and 175c may be optional components of the neural network 170. When such delay units 175a, 175b, and 175c are utilized as described herein, the neural network 170 may be referred to as a recurrent neural network.

The first stage of the neural network 170 includes inputs node 171. The inputs node 171 may receive input data at various inputs of the recurrent neural network. In some examples, the inputs node 171 may include multiple input nodes, such as input node 168, node 169, node 172, and node 174 of FIG. 1D. The second stage of the neural network 170 is a combiner stage including combiner units 173a, 173b, 173c; and delay units 175a, 175b, 175c. Accordingly, the combiner units 173 and delay units 175 may be collectively referred to as a stage of combiners. In some implementations, the combiner units 173a, 173b, and 173c may corresponds to combiner 152, combiner 154, and combiner 156 of FIG. 1D, for example. Accordingly, as described with respect to FIG. 1C with processing circuitry 112 implementing such combiners, generally processing circuitry 112 that implements the combiner units 173a-c and delay units 175a-c in the second stage may perform a nonlinear activation function using the input data from the inputs node 171 (e.g., input signals $X_1(n)$, $X_2(n)$, and $X_3(n)$). The third stage of neural network 170 includes the outputs node 177. In some examples, the outputs node 177 may include multiple additional combiners. Accordingly, in some examples, the outputs nodes 177 may be referred to as a stage of combiners. Additional, fewer, and/or different components may be used in other examples. For example, as described with respect to FIG. 2, a single combiner may comprise the outputs node 177.

The neural network 170 includes delay units 175a, 175b, and 175c, which generate delayed versions of the output from the respective combiner units 173a-c based on receiving such output data from the respective combiner units 173a-c. In the example, the output data of combiner units 173a-c may be represented as h(n); and, accordingly, each of the delay units 175a-c delay the output data of the combiner units 173a-c to generate delayed versions of the output data from the combiner units 173a-c, which may be represented as h(n-t). In various implementations, the amount of the delay, t, may also vary, e.g., one clock cycle, two clock cycles, or one hundred clock cycles. That is, the delay unit 175 may receive a clock signal and utilize the clock signal to identify the amount of the delay. In the example of FIG. 1D, the delayed versions are delayed by one time period, where '1' represents a time period. A time period may correspond to any number of units of time, such as a time period defined by a clock signal or a time period defined by another element of the neural network 170.

Continuing in the example of FIG. 1D, each delay unit 175a-c provides the delayed versions of the output data from the combiner units 173a-c as input to the combiner units 173a-c, to operate, optionally, as a recurrent neural network. Such delay units 175a-c may provide respective delayed versions of the output data from nodes of the combiner units 173a-c to respective input units/nodes of the combiner units 173a-c. In utilizing delayed versions of output data from combiner units 173a-c, the neural network 170 may utilize weights at the combiner units 173a-c (e.g., weights determined during a training process) that incorporate time-varying aspects of input data to be processed by such a neural network 170. Accordingly, the neural network 170 may be referred to as a recurrent neural network. Once trained, in some examples, the inputs node 171 receives input encoded data that is to be processed in the neural network 170. For example, each stream of input data may correspond to a different obtained set of encoded data that is representative of a temporal signal. Because a neural network 170 may incorporate the delayed versions of output data from combiner units 173a-c, the delayed versions of output data from the combiner units 173a-c provide feedback information representative of the temporal nature, with the neural network 170 providing output data faster having incorporated that temporal nature into calculating the output data. Thus, the neural network 170 may operate as a recurrent neural network. In the example, the output data may be representative of an estimate of a BER of encoded data, e.g., based on a received version of encoded data that was encoded according to the associated encoding technique.

Generally, a recurrent neural network may include multiple stages of nodes. The nodes may be implemented using processing circuitry 112 which may execute one or more functions on inputs received from a previous stage and provide the output of the functions to the next stage of the recurrent neural network. The processing circuitry may be implemented using, for example, one or more processors, controllers, and/or custom circuitry, such as an application specific integrated circuit (ASIC) and/or a field programmable gate array (FPGA). The processing circuitry may be implemented as combiners and/or summers and/or any other structure for performing functions allocated to the processing unit (e.g., one or more processors). In some examples, certain of the elements of neural networks described herein perform weighted sums, e.g., may be implemented using one or more multiplication/accumulation units, which may be implemented using processor(s) and/or other circuitry. In an example, the neural network 170 may be implemented by the electronic device 110 utilizing the processing circuitry 112 described with respect to FIG. 2.

Examples of recurrent neural network training and inference can be described mathematically. Again, as an example, consider input data at a time instant (n), given as: $X(n)=[x_1(n), x_2(n), \ldots x_N(n)]^T$. The center vector for each element in hidden layer(s) of the neural network 170 (e.g., combiner units 173) may be denoted as $C_i$ (for i=1, 2, ..., H, where H is the element number in the hidden layer).

The output of each element in a hidden layer may then be given as:

$$h_i(n)=f_i(\|X(n)+h_i(n-t)-C_i\|) \text{ for}(i=1,2,\ldots,H) \quad (1)$$

t may be the delay at the delay unit 175 such that the output of the combiner units 173 includes a delayed version of the output of the combiner units 173. In some examples, this may be referred to as feedback of the combiner units 173. Accordingly, each of the connections between a last hidden layer and the output layer may be weighted. Each element in the output layer may have a linear input-output relationship such that it may perform a summation (e.g., a weighted summation). Accordingly, an output of the i'th element in the output layer at time n may be written as:

$$mp_i(n) = \sum_{j=1}^{H} W_{ij} h_j(n) + W_{ij} h_j(n-t) = \sum_{j=1}^{H} W_{ij} f_j(\|X(n) + h_i(n-t) - C_j\|) \quad (2)$$

for (i=1, 2, ..., L) and where L is the element number of the output of the output layer and $W_{ij}$ is the connection weight between the j'th element in the hidden layer and the i'th element in the output layer.

Additionally or alternatively, while FIG. 1D has been described with respect to a single stage of combiners (e.g., second stage) including the combiner units 173a-c and delay units 175a-c, it can be appreciated that multiple stages of similar combiner stages may be included in the neural network 170 with varying types of combiner units and varying types of delay units with varying delays, for example, as will now be described with reference to FIG. 2. Further, the same neural network (e.g., the neural network 170 of FIG. 1D) can be used to facilitate decoding of encoded data from any of multiple error correction encoder by selecting different weights that were obtained by the training for the particular error correction technique employed. In the example, different weights may correspond to particular weights used to estimate a BER of encoded data based on a received version of encoded data of a particular error correction technique employed. In this manner, recurrent neural networks may serve as a NN that estimates BER (e.g., 56) for multiple encoder types. In an example implementation, the neural network 170 may be used to implement the NN 56. Advantageously, the neural network 170 utilizes delayed versions of output data from combiner units 173a-c, to provide feedback information representative of a temporal nature, e.g., operating as a recurrent neural network. As such, the neural network 170 may provide output data decoded faster with the neural network 170. For example, if a particular encoding technique is susceptible to noise during storing in a memory 140 or memory 145 (e.g., bit flips), obtained encoded data to be decoded by the neural network 170 may include noise that produces a time-varying effect on the obtained encoded data (e.g., temporal nature). Accordingly, the feedback information included in the delayed versions of output data may improve the efficiency of the neural network 170, to estimate error present in encoded data, e.g., in generating an estimate of a BER of encoded data based on a received version encoded data that is associated with an encoding technique.

Figure 2:
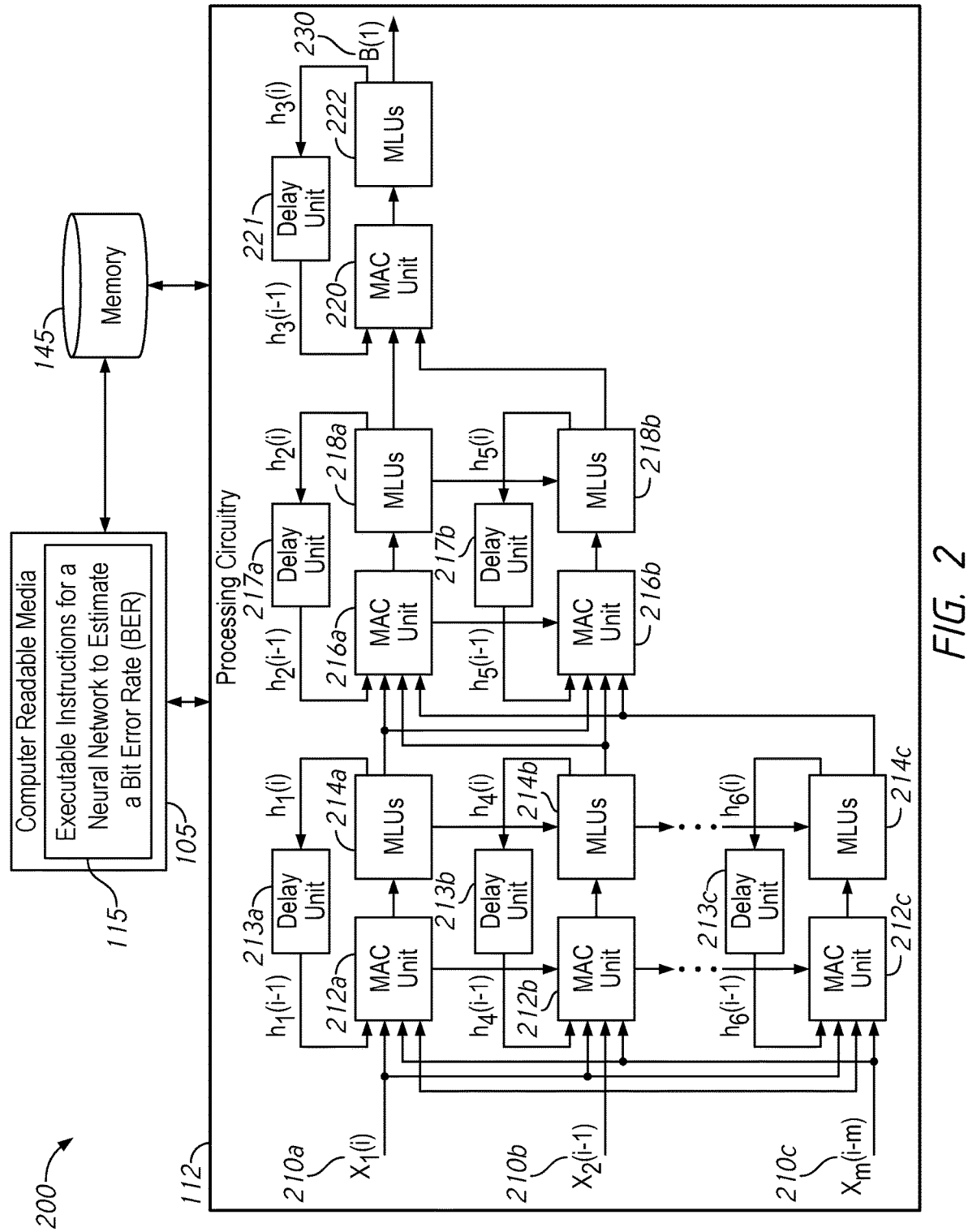
FIG. 2 is a schematic illustration of processing circuitry arranged in accordance with examples described herein.

FIG. 2 is a schematic illustration of processing circuitry 112 arranged in a system 200 in accordance with examples described herein. Such a hardware implementation (e.g., system 200) may be used, for example, to implement one or more neural networks, such as NN 56 of FIG. 1B or the recurrent neural network 170 of FIG. 1D. Additionally or alternatively, in some implementations, the processing circuitry 112 may receive input data 210a, 210b, and 210c from such a computing system. The input data 210a, 210b, and 210c may be encoded data obtained from a sensor or data stored in the memory 145. Accordingly, the input data obtained may be N bits of noisy encoded data that is provided to an input stage (e.g., an input layer) of the processing unit, with the input data 210a $X_1(i)$ corresponding to the first bit; the input data 210b $X_2(i)$ corresponding to the second bit; and the input data 210c $X_{IN}(i)$ corresponding to the N'th bit. In some examples, the obtained input data may be data encoded in accordance with an encoding technique (e.g., low density parity check coding (LDPC), Reed-Solomon coding, Bose-Chaudhuri-Hocquenghem (BCH), and/or Polar coding).

Processing circuitry 112 may implement an error reduction functionality or an estimating operation for the received encoded data at an electronic device 110 so as to output an estimate of a BER of encoded data (e.g., B(1) 230). In various implementations, processing circuitry 112 may implement a NN that estimates BER, such as NN 56 depicted in FIG. 1B. Accordingly, B(1) 230 may correspond to the estimated BER 102 of the NN 56. Processing circuitry 112 of FIG. 2, implementing a NN that estimates BER, may be referred to as a recurrent neural network.

Additionally or alternatively, in some implementations, the input data may be noisy due to noise experienced during storing of the encoded data in the memory 140 or memory 145 (e.g., bit flips). For example, encoded data stored in the memory 140 or memory 145 may be obtained as input data to be provided to the electronic device 110 in which the processing circuitry 112 is implemented.

The processing circuitry 112 may include multiplication unit/accumulation (MAC) units 212a-c, 216a-b, and 220; delay units 213a-c, 217a-b, and 221; and memory lookup units (MLUs) 214a-c, 218a-b, and 222 that, when mixed with input data obtained from the memory 145, may generate output data (e.g. B(1)) 230. Each set of MAC units and MLU units having different element numbers may be referred to as a respective stage of combiners for the processing circuitry 112. For example, a first stage of combiners includes MAC units 212a-c and MLUs 214a-c, operating in conjunction with delay units 213a-c, to form a first stage or "layer," e.g., as having "hidden" layers as part of various combiner stages. Continuing in the example, the second stage of combiners includes MAC units 216a-b and MLUs 218a-b, operating in conjunction with delay units 217a-b, to form a second stage or second layer of hidden layers. And the third stage of combiners may be a single combiner including the MAC unit 220 and MLU 222, operating in conjunction with delay unit 221, to form a third stage or third layer of hidden layers.

In an example within the context of network 170 of FIG. 1D, the first stage of combiners of processing circuitry 112—including MAC units 212a-c operating in conjunction with delay units 213a-c—can correspond to the combiner stage of neural network 170 including combiner units 173a, 173b, 173c; and delay units 175a, 175b, 175c. Continuing in example, as described with respect to the neural network 170, it may include additional stages or hidden layers in various embodiments; for example, as described, the neural network 170 may have multiple combiner stages such that outputs from one combiner stage is provided to another combiners stage, until being providing to an outputs node 177. Accordingly, in the single combiner of FIG. 2, including the MAC unit 220 and MLU 222, may be the outputs node 177.

In an example of input data being processed into a BER of encoded data, the output data 230 B(1) may be an estimate of a BER of encoded data in some examples. In operation, the processing circuitry 112, may implement executable instructions 115 for a neural network to estimate a BER of encoded data based on encoded data, stored at the computer readable media 105, to cause the processing circuitry 112 to configure the multiplication units 212a-c, 216a-c, and 220 to multiply and/or accumulate input data 210a, 210b, and 210c and delayed versions of processing results from the delay units 213a-c, 217a-b, and 221 (e.g., respective outputs of the respective layers of MAC units) with coefficient data to generate the output data 230 B(1). For example, the executable instructions 115 may cause the memory 145 to provide weights and/or other parameters stored in the memory 145, which may be associated with a certain encoding technique, to the MLUs 214a-c, 218a-b, and 222 as weights for the MAC units 212a-c, 216a-b, and 220 and delay units 213a-c, 217a-b, and 221. Accordingly, during operation, the processing circuitry 112 may implement the executable instructions 115 to select certain coefficient data (e.g., a plurality of coefficients) as weights from memory 145 based on an indicated encoding technique of the received encoded data.

In an example of executing instructions 115 for a neural network to estimate a BER of encoded data, the instructions 115 may include instructions for mixing encoded data with a plurality of coefficients or weights (e.g., stored as weights 118 in computer readable media 105), at a first layer of the MAC units 212a-c and MLUs 214a-c, the multiplication unit/accumulation units 212a-c are configured to multiply and accumulate at least two operands from corresponding input data 210a, 210b, or 210c and an operand from a respective delay unit 213a-c to generate a multiplication processing result that is provided to the MLUs 214a-c. For example, the multiplication unit/accumulation units 212a-c may perform a multiply-accumulate operation such that three operands, M N, and T are multiplied and then added with P to generate a new version of P that is stored in its respective MLU 214a-c. Accordingly, the MLU 214a latches the multiplication processing result, until such time that the stored multiplication processing result is be provided to a next layer of MAC units. The MLUs 214a-c, 218a-b, and 222 may be implemented by any number of processing elements that operate as a memory look-up unit such as a D, T, SR, and/or JK latches.

The MLUs 214a-c, 218a-b, and 222 shown in FIG. 2 may generally perform a predetermined nonlinear mapping from input to output. For example, the MLUs 214a-c, 218a-b, and 222 may be used to evaluate at least one non-linear function. In some examples, the contents and size of the various MLUs 214a-c, 218a-b, and 222 depicted may be different and may be predetermined. In some examples, one or more of the MLUs 214a-c, 218a-b, and 222 shown in FIG. 2 may be replaced by a single consolidated MLU (e.g., a table look-up). Examples of nonlinear mappings (e.g., functions) which may be performed by the MLUs 214a-c, 218a-b, and 222 include Gaussian functions, piece-wise linear functions, sigmoid functions, thin-plate-spline functions, multiquadratic functions, cubic approximations, and inverse multiquadratic functions. In some examples, selected MLUs 214a-c, 218a-b, and 222 may be by-passed and/or may be de-activated, which may allow an MLU and its associated MAC unit to be considered a unity gain element.

Additionally in the example, the MLU 214a provides the processing result to the delay unit 213a. The delay unit 213a delays the processing result (e.g., $h_1(i)$) to generate a delayed version of the processing result (e.g., $h_1(i-1)$) to output to the MAC unit 212a as operand T. While the delay units 213a-c, 217a-b, and 221 of FIG. 2 are depicted introducing a delay of '1', it can be appreciated that varying amounts of delay may be introduced to the outputs of first layer of MAC units. For example, a clock signal that introduced a sample delay of '1' (e.g., $h_1(i-1)$) may instead introduce a sample delay of '2', '4', or '100'. In various implementations, the delay units 213a-c, 217a-b, and 221 may correspond to any number of processing units that can introduce a delay into processing circuitry using a clock signal or other time-oriented signal, such as flops (e.g., D-flops) and/or one or more various logic gates (e.g., AND, OR, NOR, etc. . . . ) that may operate as a delay unit.

In the example of a first hidden layer of a recurrent neural network, the MLUs 214a-c may retrieve coefficient data stored in the memory 145, which may be weights associated with weights to be applied to the first layer of MAC units to both the data from the current period and data from a previous period (e.g., the delayed versions of first layer processing results). For example, the MLU 214a can be a table look-up that retrieves one or more coefficients to be applied to both operands M and N, as well as an additional coefficient to be applied to operand T. The MLUs 214a-c also provide the generated multiplication processing results to the next layer of the MAC units 216a-b and MLUs 218a-b. The additional layers of the MAC units 216a, 216b and MAC unit 220 working in conjunction with the MLUs 218a, 218b and MLU 222, respectively, may continue to process the multiplication results to generate the output data 230 B(1). Using such a circuitry arrangement, the output data 230 B(1) may be generated from the input data 210a, 210b, and 210c.

Advantageously, the processing circuitry 112 of system 200 may utilize a reduced number of MAC units and/or MLUs. Each subsequent layer may have a reduced portion of MAC units, delay units, and MLUs. As depicted, in FIG. 2 for example, a second layer of MAC units 216a-b, delay unit 217a-b, and MLUs 218a-b may include m−1 MAC units and MLUs, when m=3. Accordingly, the last layer in the processing circuitry 112, including the MAC unit 220, delay unit 221, and MLU 222, includes only one MAC, one delay unit, and one MLU.

The plurality of coefficients, for example from memory 145, can be mixed with the input data 210a-210c and delayed version of processing results to generate the output data 230 B(1). For example, the relationship of the plurality of coefficients to the output data 230 B(1) based on the input data 210a-c and the delayed versions of processing results may be expressed as:

$$B(1) = a^1 * f(\Sigma_{j=1}^{m-1} a^{(m-1)} f_j(\Sigma_{k=1}^{m} a^{(m)} X_k(i))) \quad (3)$$

where $a^{(m)}$, $a^{(m-1)}$, $a^1$ are coefficients for the first layer of multiplication/accumulation units 212a-c and outputs of delay units 213a-c; the second layer of multiplication/accumulation units 216a-b and outputs of delay units 217a-b; and last layer with the multiplication/accumulation unit 220 and output of delay unit 221, respectively; and where f(•) is the mapping relationship which may be performed by the memory look-up units 214a-c and 218a-b. As described above, the memory look-up units 214a-c and 218a-b retrieve coefficients to mix with the input data and respective delayed versions of each layer of MAC units. Accordingly, the output data may be provided by manipulating the input data and delayed versions of the MAC units with the respective multiplication/accumulation units using one or more pluralities of coefficients stored in the memory. The pluralities of coefficients may be specific to an iterative decoding technique associated with the encoded data. The resulting mapped data may be manipulated by additional multiplication/accumulation units and additional delay units using additional sets of coefficients stored in the memory associated with the desired encoding technique. Accordingly, pluralities of coefficients multiplied at each stage of the processing circuitry 112 may represent or provide an estimation of the processing of the input data in specifically-designed hardware (e.g., an FPGA).

Each of the multiplication unit/accumulation units 212a-c, 216a-b, and 220 may include multiple multipliers, multiple accumulation unit, or and/or multiple adders. Any one of the multiplication unit/accumulation units 212a-c, 216a-b, and 220 may be implemented using an ALU. In some examples, any one of the multiplication unit/accumulation units 212a-c, 216a-b, and 220 can include one multiplier and one adder that each perform, respectively, multiple multiplications and multiple additions. The input-output relationship of a multiplication/accumulation unit 212a-c, 216a-b, and 220 may be represented as:

$$B_{out} = \sum_{i=1}^{I} C_i * B_{in}(i)$$

where "I" represents a number to perform the multiplications in that unit, $C_i$ the coefficients which may be accessed from a memory, such as memory 145, and B (i) represents a factor from either the input data 210a-c or an output from multiplication unit/accumulation units 212a-c, 216a-b, and 220. In an example, the output of a set of multiplication unit/accumulation units, $B_{out}$, equals the sum of coefficient data, $C_i$ multiplied by the output of another set of multiplication unit/accumulation units, $B_{in}(i)$. $B_{in}(i)$ may also be the input data such that the output of a set of multiplication unit/accumulation units, $B_{out}$, equals the sum of coefficient data, $C_i$ multiplied by input data.

While described in FIG. 2 as a single processing circuitry 112 implementing a NN 56 as a neural network, it can be appreciated that, when referring to processing circuitry 112, multiple processing circuitry 112 may estimate a BER of encoded data based on a received version of encoded data, e.g., as depicted in FIG. 1C, with electronic device 110 having multiple processing circuitry 112. For example, multiple stored versions of encoded data may be, respectively, used by multiple implementations of a NN 56, to estimate BERs of those stored versions. Additionally or alternatively, processing circuitry 112 may be used to implement other NNs, such as additional NNs in an electronic device, like electronic device 110. For example, as described below with reference to FIG. 5, a NN 56 that estimates a BER may be implemented as the first neural network 518, while another second neural network 512 may be implemented in that same controller 508. In some implementations, the same processing circuitry 112 may be used to implement various neural networks during different time periods; or, in some implementations, various multiple processing circuitry 112 may be used to implement various neural networks in an electronic device (e.g., first neural network 518 and second neural network 512 in controller 508).

Figure 3:
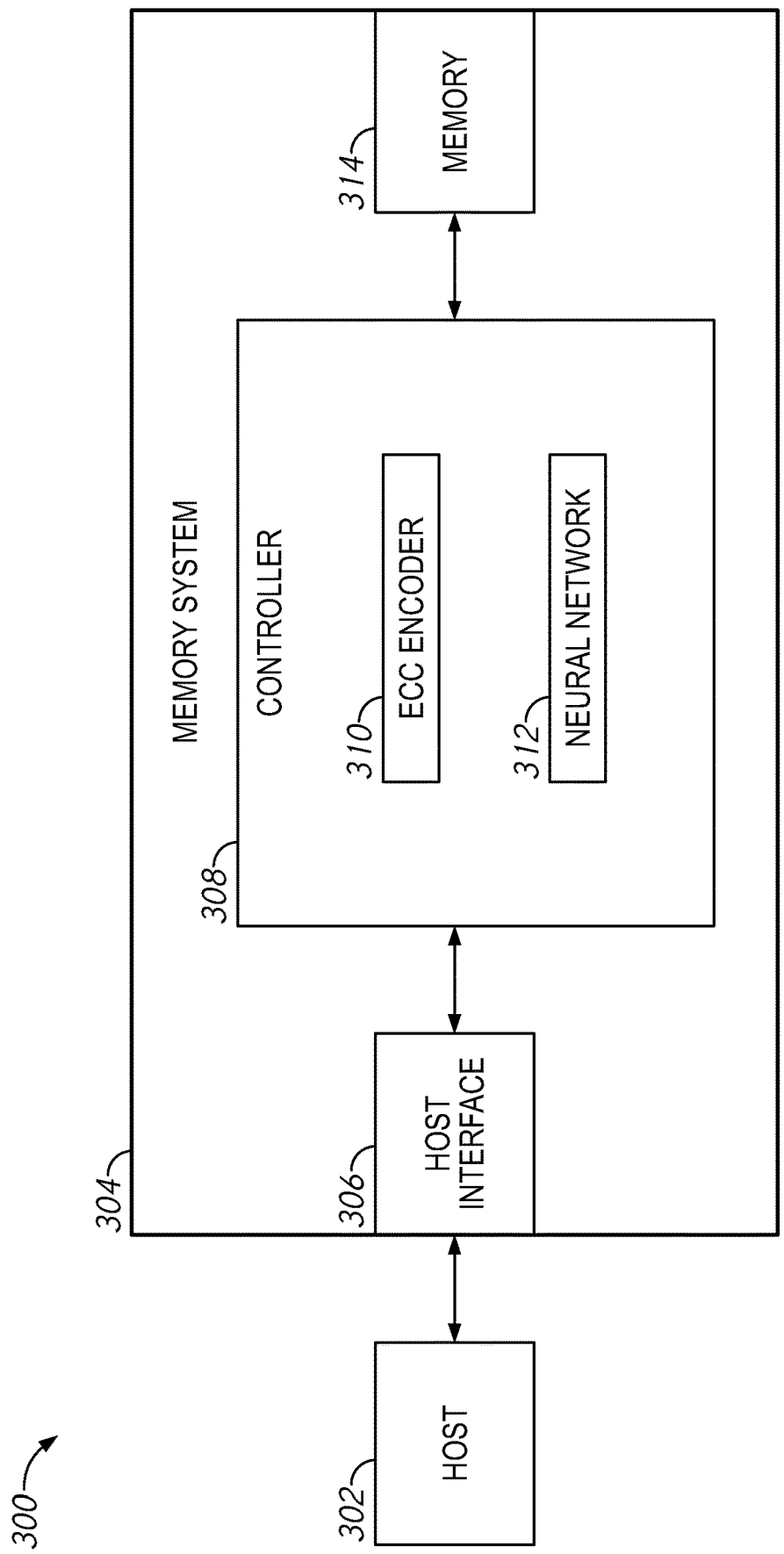
FIG. 3 is a schematic illustration of an apparatus arranged in accordance with examples described herein.

FIG. 3 is a schematic illustration of apparatus 300 (e.g., an integrated circuit, a memory device, a memory system, an electronic device or system, a smart phone, a tablet, a computer, a server, an appliance, a vehicle, etc.) according to an embodiment of the disclosure. The apparatus 300 may generally include a host 302 and a memory system 304.

The host 302 may be a host system such as a personal laptop computer, a desktop computer, a digital camera, a mobile telephone, or a memory card reader, among various other types of hosts. The host 302 may include a number of memory access devices (e.g., a number of processors). The host 302 may also be a memory controller, such as where memory system 304 is a memory device (e.g., a memory device having an on-die controller).

The memory system 304 may be a solid state drive (SSD) or other type of memory and may include a host interface 306, a controller 308 (e.g., a processor and/or other control circuitry), and a number of memory device 314. The memory system 304, the controller 308, and/or the memory device 314 may also be separately considered an "apparatus." The memory device 314 may include a number of solid state memory devices such as NAND flash devices, which may provide a storage volume for the memory system 304. Other types of memory may also be used.

The controller 308 may be coupled to the host interface 306 and to the memory device 314 via a plurality of channels to transfer data between the memory system 304 and the host 302. The interface 306 may be in the form of a standardized interface. For example, when the memory system 304 is used for data storage in the apparatus 300, the interface 306 may be a serial advanced technology attachment (SATA), peripheral component interconnect express (PCIe), or a universal serial bus (USB), among other connectors and interfaces. In general, interface 306 provides an interface for passing control, address, data, and other signals between the memory system 304 and the host 302 having compatible receptors for the interface 306.

The controller 308 may communicate with the memory device 314 (which in some embodiments can include a number of memory arrays on a single die) to control data read, write, and erase operations, among other operations. The controller 308 may include a discrete memory channel controller for each channel (not shown in FIG. 3) coupling the controller 308 to the memory device 314. The controller 308 may include a number of components in the form of hardware and/or firmware (e.g., one or more integrated circuits) and/or software for controlling access to the memory device 314 and/or for facilitating data transfer between the host 302 and memory device 314.

The controller 308 may include an ECC encoder 310 for encoding data bits written to the memory device 314 using one or more encoding techniques. The ECC encoder 310 may include a single parity check (SPC) encoder, and/or an algebraic error correction circuit such as one of the group including a Bose-Chaudhuri-Hocquenghem (BCH) ECC encoder and/or a Reed Solomon ECC encoder, among other types of error correction circuits. Accordingly, the ECC encoder 310 may store or provide encoded data to the memory device 314 based on operations implemented by the controller 308, e.g., for the host 302. During storage or transmission of the encoded data output by ECC encoder 310, noise related to or from the memory controller 308 may be introduced into the encoded data. For example, during transmission or communication of encoded data in the memory system 304, the encoded data, which is communicated over a bus from the ECC encoder 310 to the memory device 314, may experience noise due to voltage or current disturbances in the memory controller 308 or more generally the memory system 304. Accordingly, the encoded data stored in the memory device 314 may be representative of a version of the N bits of encoded data (x1, x2, ... xN) (e.g., as output from an encoder 14 of FIG. 1A).

The controller 308 may further include a NN 312 to estimate a BER of a stored version of encoded data. In operation, the controller 308 may execute memory commands, such that the encoded data stored in the memory device 314 is retrieved and decoded when retrieved from the memory device 314. In the example implementation, the memory device 314 may, for example, include one or more output buffers which may read encoded data from memory cells of the memory device 314. The output buffers may provide output data to various components of the memory system 304, for example, to an ECC decoder (not depicted). In some implementations, when the encoded data is retrieved from the memory device 314 for decoding, the encoded data may be provided to the NN 312. For example, once received as a version of encoded data at the NN 312, the NN 312 may operate in conjunction with an ECC decoder to facilitate providing decoded data. During transmission from the memory device 314 to the NN 312, the encoded data may experience noise on the bus coupling the memory device 314 to the error reduction NN 312, e.g., due to voltage or current disturbances on the bus, in the memory controller 308, or more generally in the memory system 304.

Additionally or alternatively with respect to noise in the encoded data, storing N encoded data (b1, b2, ... bN) in memory device 314 may introduce environmental or other noise. For example, noise may be introduced in storing the encoded data in memory device 314 that is degraded (e.g., due to bit flips). Accordingly, encoded data retrieved from the memory device 314 may be referred to as a stored version of encoded data, which may include errors present in that stored version of encoded data. For example, the errors may be error bits due to certain bits of the encoded data being flipped when stored in the memory device 314.

In the example, based on the received version of encoded data received and weights acquired during a training process of the NN 312 (e.g., trained as the NN 56), the NN 312 estimates a BER of the encoded data (e.g., estimated BER 102) based on the received version of encoded data (x1, x2, ... xN). Thus, the NN 312 generates an estimated BER of the N bits of encoded data (b1, b2, ... bN). For example, the estimate of the BER of the encoded data may be equivalent to a calculated BER of output from the ECC encoder 310 and/or a calculated BER of N bits of encoded data once retrieved from the memory device 314. In this manner, a neural network may be used to implement a NN 312 which has been trained to receive encoded data and output a BER of the encoded data. Advantageously, estimating a BER of encoded data prior to decoding of that encoded data may improve processing speed (e.g., time to decode encoded data) or reduce computational/power resources used for decoding. In various implementations, the NN 312 may be implemented by one or multiple processing circuitry 112 (e.g., one or more of the processing circuitry 112 depicted in FIG. 2).

The neural network 170 of FIG. 1D (e.g., as implemented by processing circuitry 112 of FIG. 2) may be used to implement the NN 312 of FIG. 3. In the example, the memory 145 of FIG. 2 may store pluralities of coefficients specific to one or more types encoded data that may encoded by the ECC encoder 310. Accordingly, a hardware implementation of neural network 170 may be used as the NN 312 to estimate a BER of encoded data based on input data encoded by the ECC encoder 310, using any of multiple encoding techniques available to the ECC encoder.

The ECC encoder 310 may be implemented using discrete components such as an application specific integrated circuit (ASIC) or other circuitry, or the components may reflect functionality provided by circuitry within the controller 308 that does not necessarily have a discrete physical form separate from other portions of the controller 308. Although illustrated as a component within the controller 308 in FIG. 3, the ECC encoder 310 may be external to the controller 308 or have a number of components located within the controller 308 and a number of components located external to the controller 308.

The memory device 314 may include a number of arrays of memory cells (e.g., non-volatile memory cells). The arrays can be flash arrays with a NAND architecture, for example. However, embodiments are not limited to a particular type of memory array or array architecture. Floating-gate type flash memory cells in a NAND architecture may be used, but embodiments are not so limited. The cells may be multi-level cells (MLC) such as triple level cells (TLC) which store three data bits per cell. The memory cells can be grouped, for instance, into a number of blocks including a number of physical pages. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

According to a number of embodiments, controller 308 may control encoding of a number of received data bits according to the ECC encoder 310 that allows for later identification of erroneous bits and the conversion of those erroneous bits to erasures. The controller 308 may also control programming the encoded number of received data bits to a group of memory cells in memory device 314.

The apparatus shown in FIG. 3 may be implemented in any of a variety of products employing processors and memory including for example cameras, phones, wireless devices, displays, chip sets, set top boxes, gaming systems, vehicles, and appliances. Resulting devices employing the memory system may benefit from examples of neural networks described herein to perform their ultimate user function.

Figure 4:
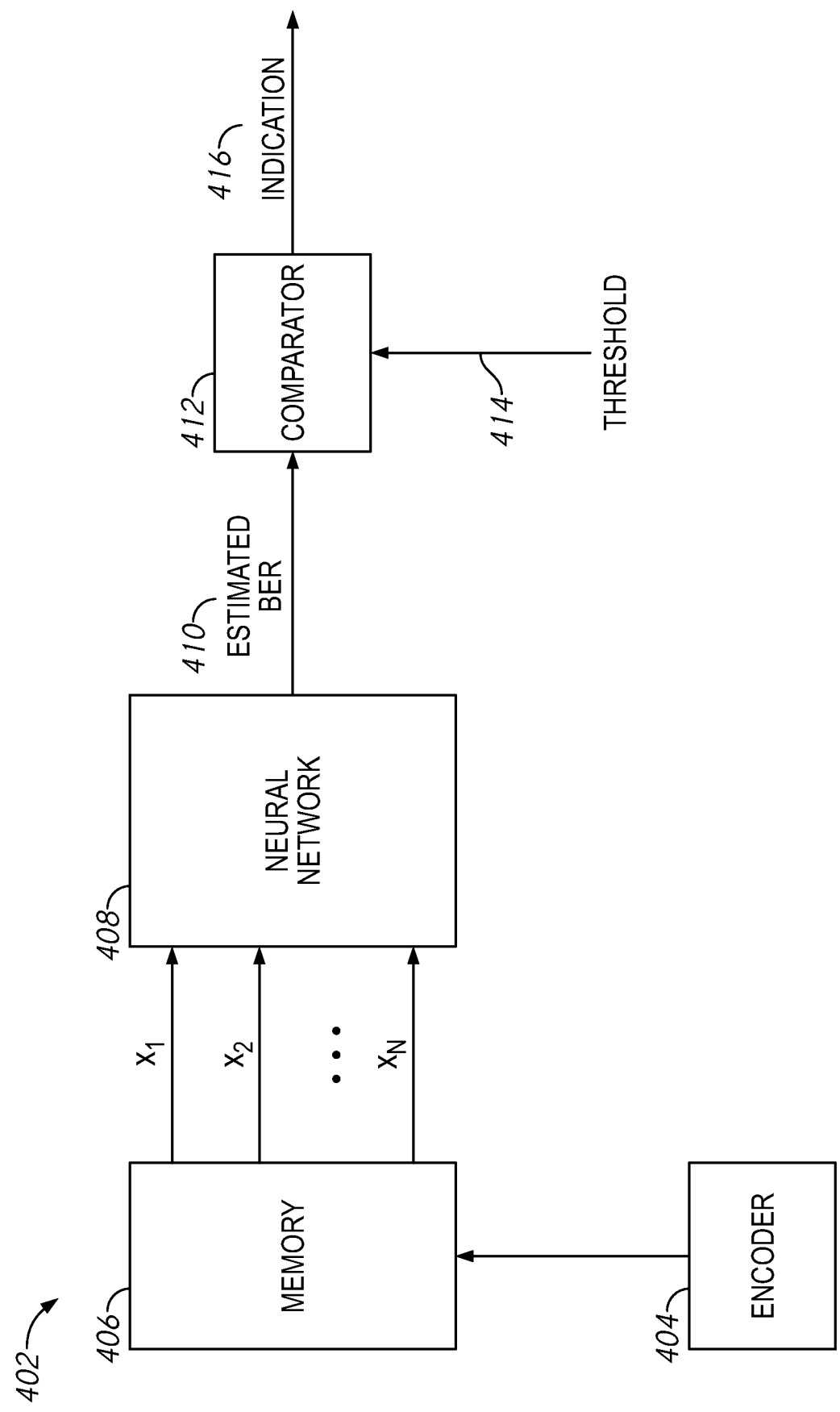
FIG. 4 is a schematic illustration of an example of a memory system arranged in accordance with examples described herein.

FIG. 4 is a schematic illustration of an example of a memory system 402 arranged in accordance with examples described herein. Similarly-named elements of FIG. 4 may operate as described with respect to FIG. 1B, but may also include additional features as described with respect to FIG. 4. For example, FIG. 4 depicts memory 406 and neural network 408, which may operate as described with respect to memory 54 and neural network 56 of FIG. 1B. Accordingly, the memory system 402 includes encoder 404 coupled to a memory 408 (e.g., a memory device). The encoder 404 may provide encoded data to the memory 406 for storage and/or may transmit, via the memory 406, the encoded data to the neural network (NN) 408. The memory 406 may provide the N bits of encoded data (x1, x2, . . . xN) to the NN 408. In the example, the N bits of encoded data (x1, x2, . . . xN), output by the memory 406, are representative of the N bits of encoded data (b1, b2, . . . bN) output by the encoder 404, but with errors being introduced. For example, storing N bits of encoded data (b1, b2, . . . bN) in memory 406 may introduce environmental or other noise. Accordingly, noise may be introduced in storing the encoded data in memory 406 that is degraded (e.g., due to bit flips). Accordingly, encoded data retrieved from the memory 406 may be referred to as a stored version of encoded data, which may include errors present in that stored version of encoded data. For example, the errors may be error bits due to certain bits of the encoded data being flipped when stored in the memory 406. Thus, error being present in the encoded data whether by transmission or storage or other reason, the NN 408 receives N bits of encoded data as the encoded data (x1, x2, . . . xN).

The memory system 402 may further include the NN 408 that estimates a BER 410 of encoded data based on the received version of encoded data (x1, x2, . . . xN). The NN 408 be implemented using any type of neural network, including examples of recurrent neural networks described herein.

The memory system 402 may further include the comparator 412, which may be a memory element or logic gate in a memory system. For example, the comparator 412 may be implemented in control logic of a memory controller. Once an estimated BER 410 is obtained in the memory system 402, the estimated BER 410 is provided to a comparator 412 for comparison with a threshold 414 which may, e.g. retrieved from a memory and/or hard-coded into the comparator 412. The comparator 412 may compare the estimated BER 410 with the threshold 414 and output an indication 416 of whether the estimated BER meets a threshold (e.g., compares favorably with one or more thresholds). For example, a certain sequence of bits may be provided, as the indication 416, if the estimated BER 410 passes (e.g., is less than) the threshold 414. The threshold 414 may be a number of errors and/or a BER that the system may tolerate for decoding, such as a threshold BER level. Accordingly, if the estimated BER 410 passes or meets the threshold 414, the indication 416 may be provided to another neural network, to indicate that decoding of the encoded data may be performed. For example, another neural network may be trained to decode the encoded data, in which case the indication 416 is provided to activate that decoding neural network. The indication 416 may be implemented using one or more bits. The indication 416 may be used by a memory controller (e.g., memory controller 308 or memory controller 508, as described below) to be provided in a header as part of a memory command issued by the memory controller. In some implementations, the indication may be binary (e.g., a '0' or '1'), tertiary, or other combinations of bits thereof. In some examples, the indication 416 may be used to activate one or more additional neural network(s).

On the other hand, if the estimated BER 410 does not pass or does not meet the threshold 414, the indication 416 may be provided to another neural network, to indicate that another NN may perform an error reduction technique to the encoded data. For example, another neural network may be trained to reduce the error present in the encoded data; in which case the indication 416 is provided to activate that error reduction neural network. For example, the indication may be implemented using one or more bits. The bits may be selected to indicate the estimated BER 410 does not pass the threshold 414 (e.g., the estimated BER exceeds a threshold). The certain sequence of bits provided as the indication 416 when the estimated BER 410 does not pass the threshold 414 may be different than the certain sequence of bits provided as the indication 416 when the estimated BER 410 does pass the threshold 414.

In various implementations, the threshold 414 may be a BER level related to the operation of the memory 406. For example, the threshold 414 may be a BER level specified for the memory 406, e.g., as related to an operational status of the memory 406 when a certain number of memory cells are defective. Additionally or alternatively, the BER level specified as the threshold 414 may relate to a BER target level for a particular encoding technique utilized by the memory system 402. Accordingly, encoded data will be decoded by the memory system 402 only when the BER target level is met, e.g., as compared at the comparator 412 with an estimated BER 410 for certain encoded data. If that BER target level is not met, the indication 416 may be provided to another neural network to reduce the error present in the encoded data, e.g., an error reduction neural network, as further described next with respect to FIG. 5.

Figure 5:
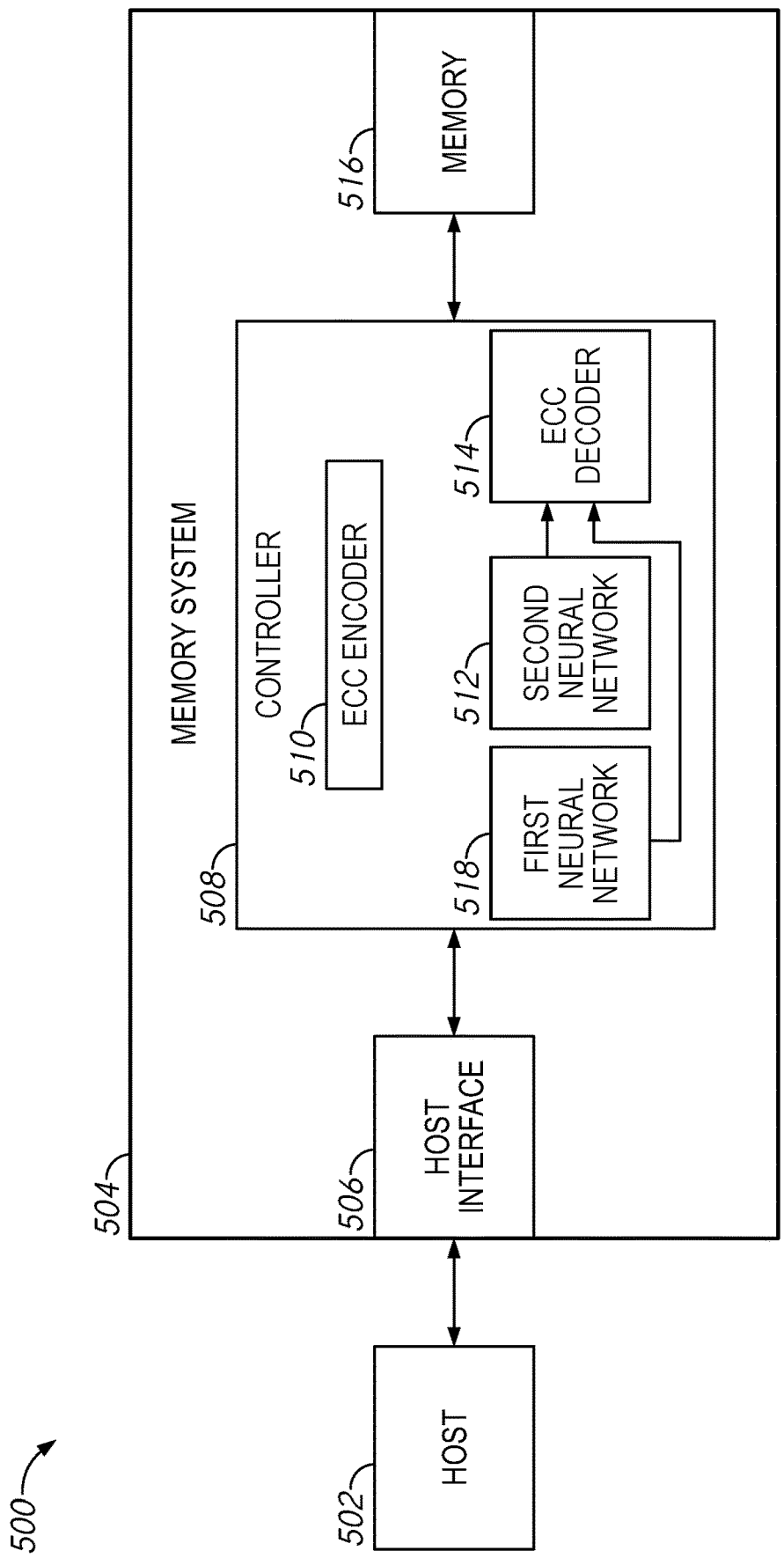
FIG. 5 is a schematic illustration of an apparatus arranged in accordance with examples described herein.

FIG. 5 is a schematic illustration of an apparatus 500 arranged in accordance with examples described herein. Similarly-named elements of FIG. 5 may operate as described with respect to FIG. 3, but may also include additional features as described with respect to FIG. 5. For example, FIG. 5 depicts ECC encoder 510, first neural network 518, and memory 516; which may operate as described with respect to ECC encoder 310, neural network 312, and memory 314 of FIG. 3, respectively. Accordingly, like the similarly-named elements of FIG. 3, the apparatus 500 generally includes a host 502 and a memory system 504. Additionally, the memory system 504 may include a host interface 506, a controller 508 (e.g., a processor and/or other control circuitry), and a number of memory devices 516. The controller 508 may be coupled to the host interface 506 and to the memory device 516 via a plurality of channels to transfer data between the memory system 504 and the host 502. The controller 508 may communicate with the memory device 514 (which in some embodiments can include a number of memory arrays on a single die) to control data read, write, and erase operations, among other operations.

The controller 508 may also include an ECC encoder 510 for encoding data bits written to the memory device 514 using one or more encoding techniques. Accordingly, the ECC encoder 510 may store or provide encoded data to the memory device 516 based on operations implemented by the controller 508, e.g., for the host 502. During storage or transmission of the encoded data output by ECC 510, noise related to or from the memory controller 508 may be introduced into the encoded data. For example, during transmission or communication of encoded data in the memory system 504, the encoded data, which is communicated over a bus from the ECC encoder 510 to the memory device 516, may experience noise due to voltage or current disturbances in the memory controller 508 or more generally the memory system 504. Accordingly, the encoded data stored in the memory device 516 may be representative of a version of the N bits of encoded data (x1, x2, ... xN) (e.g., as output from an encoder 14 of FIG. 1A).

The controller 508 may further include the ECC decoder 514, which may be capable of decoding data for any type of encoding technique that is utilized by the ECC encoder 510. The ECC decoder 514 may receive a version of encoded data from the second neural network 512, which will be described in further detail next. The ECC decoder 514 may decode the version of encoded data in accordance with a corresponding decoding process of an ECC encoding technique. Based on the version of encoded data, the ECC decoder 514 may provide decoded data in accordance with a decoding technique implemented by the ECC decoder 514. In some examples, the ECC decoder 514 may include an iterative decoder, such as message probability computing (MPC) circuitry. In the example, the ECC decoder 514 may implement one or more message passing techniques to perform decoding.

The ECC encoder 510 and the ECC decoder 514 may each be implemented using discrete components such as an application specific integrated circuit (ASIC) or other circuitry, or the components may reflect functionality provided by circuitry within the controller 508 that does not necessarily have a discrete physical form separate from other portions of the controller 508. Although illustrated as components within the controller 508 in FIG. 5, each of the ECC encoder 510 and ECC decoder 514 may be external to the controller 508 or have a number of components located within the controller 508 and a number of components located external to the controller 508. While depicted in FIG. 5 as being implemented in the controller 508, in various implementations, the ECC encoder 510 and ECC decoder 514 may be implemented in separate controllers or separate memory systems. For example, encoded data generated by the ECC encoder 510 in controller 508 may be decoded at an ECC decoder 514 implemented in another memory system in the apparatus 500, different than the memory system 504.

The controller 508 may further include the first neural network 518 and the second neural network 512. As noted previously, the first neural network 518 may operate as described with respect to neural network 312 to estimate a BER of a stored version of encoded data. The first NN 518 may receive a stored version of encoded data that is stored in the memory device 516 via the bus coupling the memory device 516 to the controller 508. The first NN 518 generates an estimated BER of the N bits of encoded data (b1, b2, ... bN). For example, the estimate of the BER of the encoded data may be equivalent to a calculated BER of output from the ECC encoder 510 and/or a calculated BER of N bits of encoded data once retrieved from the memory device 516. In this manner, a neural network may be used to implement a first NN 518 which has been trained to receive encoded data and output a BER of the encoded data. Advantageously, estimating a BER of encoded data prior to decoding of that encoded data at ECC decoder 514 may improve processing speed (e.g., time to decode encoded data) or reduce computational/power resources used for decoding. In various implementations, the first NN 518 may be implemented by one or multiple processing circuitry 112 (e.g., one or more of the processing circuitry 112 depicted in FIG. 2). Additionally or alternatively, the neural network 170 of FIG. 1D (e.g., as implemented by processing circuitry 112 of FIG. 2) may be used to implement the first NN 518 of FIG. 5. In the example, the memory 145 of FIG. 2 may store pluralities of coefficients specific to one or more types encoded data that may encoded by the ECC encoder 510. Accordingly, a hardware implementation of neural network 170 may be used as the first NN 518 to estimate a BER of encoded data based on input data encoded by the ECC encoder 510, using any of multiple encoding techniques available to the ECC encoder.

Once an estimated BER is generated by the first neural network 518 in the memory system 508, the estimated BER may be provided to a comparator (e.g., a comparator 412 of FIG. 4) for comparison with a BER threshold. The comparator may compare the estimated BER with the threshold and output an indication (e.g., indication 416). Like the threshold 414, the BER threshold may be a number of errors that the system may tolerate for decoding, such as a threshold BER level. Accordingly, if the estimated BER passes or meets the BER threshold, the indication (e.g., indication 416) may be provided to the ECC decoder 514 via a coupling between the first NN 518 and the ECC decoder 514, to indicate that decoding of the encoded data may be performed. The ECC decoder 514 may be implemented as an iterative decoder, e.g., including message probability computing (MPC) circuitry. Advantageously, using an estimated BER of encoded data, a version of encoded data may be decoded that improves processing speed (e.g., time to decode encoded data) or reduce computational/power resources used for decoding. For example, when the estimated BER passes or meets the BER threshold, a number of decoding iterations for an iterative decoder implementation of the ECC decoder 514 may be reduced, thereby improving processing speed of the memory system 508.

In some implementations of the ECC decoder 514, another neural network may be trained and implemented at the ECC decoder 514 to decode the encoded data, in which case the indication (e.g., indication 416) from the first neural network may be used to activate that decoding neural network. Accordingly, in case of the BER threshold being met, the ECC decoder 514 may be implemented as a neural network that is trained to receive encoded data and use coefficients trained upon MPC circuitry, to output decoded data.

Additionally or alternatively, in some implementations, if the estimated BER passes or meets the BER threshold, the indication (e.g., indication 416) may be provided to a second neural network 512 to indicate that the second neural network 512 is not to be activated and that decoding of a stored version of encoded data may occur at the ECC decoder 514, e.g., as implemented as an iterative decoder or any decoder that may decode using a corresponding decoding process of an ECC encoding technique.

In the implementation of memory system 508, if the estimated BER does not pass or does not meet the threshold, the indication may be provided to the second neural network 512, to indicate that the second neural network 512 may perform an error reduction technique to the encoded data. For example, the second neural network 512 may be trained to reduce the error present in the encoded data; in which case the indication is provided to activate that second neural network 512. A training of the second neural network 512 may include receiving known errored-encoded data and known encoded data to determine coefficients that reduce error present in encoded data, such that a trained second neural network 512 estimates an error-reduced version of encoded data. Continuing in the example implementation, the second neural network 512 may be configured to receive the stored version of the encoded data including at least one error bit based on a comparison of the estimated BER with a threshold. The second neural network 512 may be configured to mix the stored version of the encoded data with an additional set of predetermined weights selected for error reduction of data retrieved from memory, to estimate an error-reduced version of the encoded data. Additionally or alternatively, the neural network 170 of FIG. 1D (e.g., as implemented by processing circuitry 112 of FIG. 2) may be used to implement the second NN 512 of FIG. 5.

In the event that the second neural network 512 does provide an error-reduced version of encoded data, the ECC decoder 514 may receive and decode the error-reduced version of encoded data in accordance with a corresponding decoding process of an ECC encoding technique. Accordingly, based on the error-reduced version of encoded data, the ECC decoder 514 may provide decoded data in accordance with a decoding technique implemented by the ECC decoder 514. Decoding an error-reduced version of encoded data at the ECC decoder 514 may also include identifying erroneous cells, converting erroneous cells to erasures, and/ or correcting the erasures. Accordingly and advantageously, using an estimated BER of encoded data, a version of encoded data may be decoded with less errors present in the decoded data, as compared to the N bits of encoded data (x1, x2, ... xN) retrieved from memory 54, which may include error bits due to noise introduced during storage or communication of the encoded data.

Figure 6:
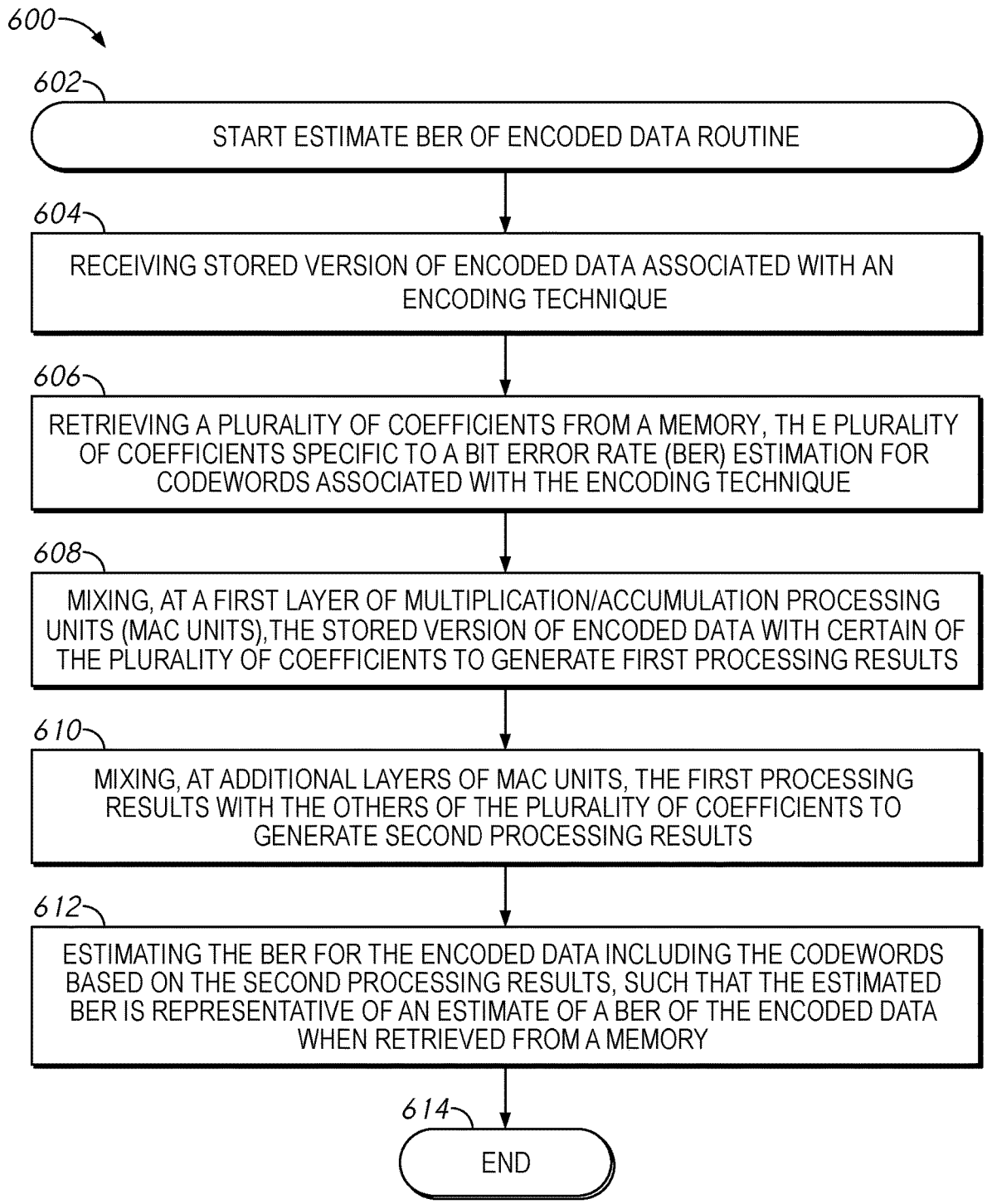
FIGS. 6 and 7 are flowcharts of methods arranged in accordance with examples described herein.

FIG. 6 is a flowchart of a method 600 in accordance with examples described herein. Example method 600 may be implemented using, for example, the NN 56 of FIG. 1B, system 100 in FIG. 1C, neural network 170 of FIG. 1D (e.g., being implemented by processing circuitry 112 of FIG. 2), the NN 312 of FIG. 3, the NN 408 of FIG. 4, and/or the first neural network 518 of FIG. 5, or any system or combination of the systems depicted in the aforementioned Figures. In some examples, the blocks in example method 600 may be performed by a computing device such as an electronic device 110 of FIG. 1C and/or in conjunction with processing circuitry 112 of FIG. 2. The operations described in blocks 602-612 may also be stored as computer-executable instructions in a computer-readable media 105, storing the executable instructions 115 for a neural network to estimate a BER of encoded data, e.g., based on a received version of encoded data.

Example method 600 may begin with a block 602 that starts execution of estimate a BER of encoded data routine. The method may include a block 604 that recites "receiving stored version of encoded data associated with an encoding technique." In the context of apparatus 300, the encoded data may be obtained from the memory device 314, as described with respect to FIG. 3. As described herein, one or more processing circuitry 112, implementing a NN that estimates BER, may be configured to obtain a variety of types of input data that may be encoded with various encoding techniques, such as data that has been encoded with a low density parity check coding (LDPC), a Reed-Solomon coding, a Bose-Chaudhuri-Hocquenghem (BCH), and/or Polar coding. In the example, during transmission of the encoded data from a memory (e.g., memory device 314) to the NN, the encoded data may experience noise, e.g., due to voltage or current disturbances in a computing or electronic device in which the memory device resides. Additionally or alternatively with respect to noise in the encoded data, storing encoded data in a memory may introduce environmental or other noise. For example, noise may be introduced in storing the encoded data in a memory that is degraded (e.g., due to bit flips). Accordingly, encoded data retrieved from a memory may be referred to as a stored version of encoded data, which may include errors present in that stored version of encoded data. For example, the errors may be error bits due to certain bits of the encoded data being flipped when stored in the memory.

Block 604 may be followed by block 606 that recites "retrieving a plurality of coefficients from a memory, the plurality of coefficients specific to a bit error rate (BER) estimation for codewords associated with the encoded technique." As described herein, the processing unit may retrieve coefficients for mixing with encoded data; for example, utilizing a memory look-up unit (MLU). For example, the memory may store (e.g., in a database) associations between pluralities of coefficients and certain types of encoded data. In the example, the pluralities of coefficients may be the weights for each encoding type; which, when used by a neural network, allow the neural network to estimate a BER of encoded data. The weights may be stored, for example, in the weights memory 118 of FIG. 1C. Accordingly, processing circuitry 112 may retrieve the plurality of coefficients specific to BER estimation for codewords. For example, the processing circuitry 112 may select the coefficients from a memory part of the implementing computing device, from a memory part of an external computing device, or from a memory implemented in a cloud-computing device. In turn, the plurality of coefficients may be retrieved from the memory as requested by the processing circuitry 112.

Block 606 may be followed by block 608 that recites "mixing, at a first layer of multiplication/accumulation processing units (MAC units), stored version of encoded data with certain of the plurality of coefficients to generate first processing results." As described herein, the processing circuitry 112 utilizes certain of the plurality of coefficients such that mixing such coefficients with data stored version of encoded data generates output data that reflects the processing of the input data with coefficients by the circuitry of FIG. 3. In some implementations of a recurrent neural network (e.g., neural network 170), delayed versions of respective outputs of the first layer of MAC units and the stored version of encoded data are mixed to generate the output data, e.g., an estimate of a BER of encoded data. For example, various ALUs in an integrated circuit may be configured to operate as the circuitry of FIG. 2, thereby mixing the input data and delayed versions of respective outputs of the first layer of MAC units with the coefficients as described herein. For example, with reference to FIG. 2, the input data and delayed versions of respective outputs of the first layer of MAC units may be calculated with the plurality of coefficients to generate first processing results, at a first layer of multiplication/accumulation units (MAC units). In some examples, various hardware platforms may implement the circuitry of FIG. 2, such as an ASIC, a DSP implemented as part of a FPGA, or a system-on-chip.

Block 608 may be followed by block 610 that recites "mixing, at additional layers of MAC units, the first processing results with other of the plurality of coefficients to generate second processing results." As described herein, the processing circuitry 112 utilizes additional plurality of coefficients such that mixing the other coefficients with certain processing results generates output data that reflects the processing of the input data with coefficients by the circuitry of FIG. 2. In some implementations of a recurrent neural network (e.g., neural network 170), the first processing results and delayed versions of at least a portion of the first processing results are mixed to generate the output data (e.g., an estimate of decoded data). For example, with reference to FIG. 2, the processing results of the first layer (e.g., multiplication processing results) and delayed versions of at least a portion of those processing results may be calculated with the additional plurality of coefficients to generate second processing results, at a second layer of multiplication/accumulation units (MAC units). The processing results of the second layer may be calculated with an additional plurality of coefficients to generate the output data B(1) 230, which is output as the estimated BER.

Block 610 may be followed by block 612 that recites "estimating the BER for the encoded data including the codewords based on the second processing results, such that the estimated BER is representative of an estimate of a BER of the encoded data when retrieved from a memory." As described herein, the neural network 170 provides output data as output bits which represent the processed data based on the second processing results (or the first processing results, if block 610 is an optional). The output data corresponds to a bit error rate (BER) of the number of errors in the encoded data (e.g., N encoded input bits) retrieved from a memory as compared to the known codewords output by an encoder (e.g., the encoded data output by encoder 14 (b1, b2, . . . bN). For example, a memory (e.g., memory 54 or memory 516) may include a certain number of degraded cells that the estimated BER represents as an error rate of the memory 54 for any encoded data stored thereon. Accordingly, a neural network 170 (e.g., implemented as NN 56) may estimate a BER calculation using the N bits of encoded data (x1, x2, . . . xN). Accordingly, the estimated BER of encoded data is an estimate of the calculated BER of encoded data when retrieved from memory, e.g., a calculation of error bits to non-error bits in the N bits of encoded data (e.g., using known codewords) and/or a comparison of the known L bits of input data (a1, a2, . . . aL) to an output of decoded data. Advantageously, an estimate of the BER of the encoded data may be used to compare to a BER threshold, so as to activate additional neural networks (e.g., a decoding neural network) based on the BER threshold. Accordingly and advantageously, estimating a BER of encoded data prior to decoding of that encoded data may improve processing speed (e.g., time to decode encoded data) or reduce computational/power resources used for decoding. Thus, neural networks described herein transform encoded data to an estimate of a BER of encoded data. Block 612 may be followed by block 614 that ends the example method 600. In some examples, block 610 may be an optional block.

Figure 7:
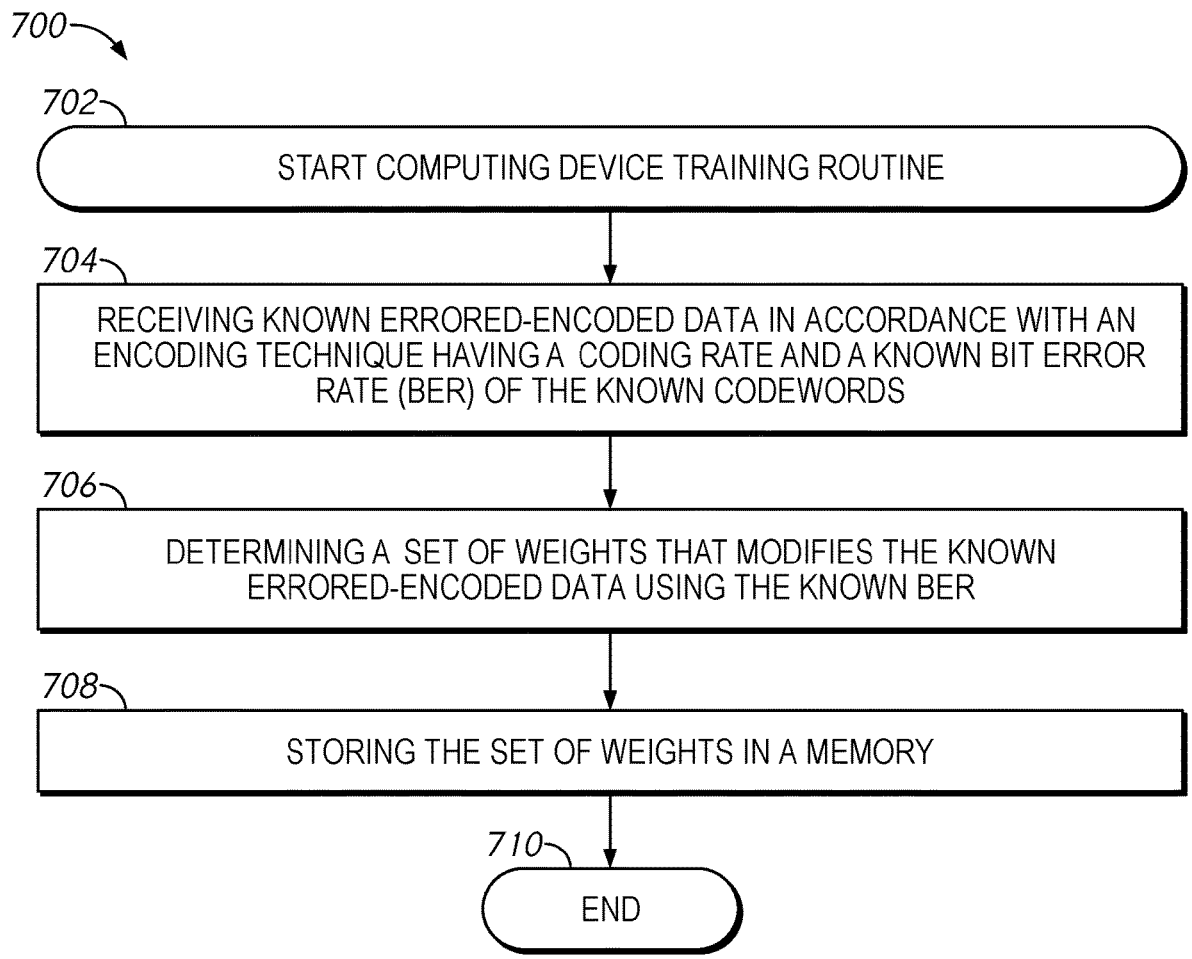

FIG. 7 is a flowchart of a method 700 arranged in accordance with examples described herein. Example method 700 may be implemented using, for example, the NN 56 of FIG. 1B, system 100 in FIG. 1C, neural network 170 of FIG. 1D (e.g., being implemented by processing circuitry 112 of FIG. 2), the NN 312 of FIG. 3, the NN 408 of FIG. 4, and/or the first neural network 518 of FIG. 5, or any system or combination of the systems depicted in the aforementioned Figures. For example, a NN 56, an NN 312, an NN 408, or first NN 518 may be trained using the method 700. In some examples, the blocks in example method 700 may be performed by a computing device such as an electronic device 110 of FIG. 1C and/or in conjunction with a processing circuitry, such as processing circuitry 112 of FIG. 2. The operations described in blocks 702-710 may also be stored as computer-executable instructions in a computer-readable media 105, storing executable instructions to train a neural network to estimate a BER of encoded data based on encoded data (e.g., a stored version of encoded data). Additional, fewer, and/or different blocks may be used in other examples, and the order of the blocks may be different in other examples.

Example method 700 may begin with a block 702 that starts execution of the computing device training routine. The method may include a block 704 recites "receiving known errored-encoded data in accordance with an encoding technique having a coding rate and a known bit error rate (BER) of the known codewords." Known errored-encoded data and a known BER may be received by a computing device (e.g., electronic device 110) that includes a neural network, such as the neural network 170 of FIG. 1D (e.g., as implemented by one or more processing circuitry 112 of FIG. 2). In the example, the known errored-encoded data may correspond to known encoded data but with at least one error bit introduced into the encoded data in at least one known portion of the encoded data. For example, some of the known codewords, coded at the coding rate associated with the encoding technique, may include particular known error bits introduced into the known codewords, in either a patterned fashion or randomly. For example, an NN 56 may be trained multiple times, using different known codewords including at least one error bit and known BERs. For example, the known errored-encoded data includes the known codewords having a particular coding rate, in addition to known error bits introduced into particular codewords. Accordingly, the known errored-encoded data may be representative of a received version of encoded data (x1, x2, . . . xN) that is retrieved from a memory, e.g., a stored version of encoded data.

In the example, the known codewords may be encoded in accordance with an encoding technique, e.g., by ECC encoder 310. Continuing in the example, the known codewords may be stored in memory and retrieved as the known-errored encoded data from the memory (e.g., memory device 314) of a computing device 300. Any of a variety of encoding techniques may have been used to encode the data. For example, the known-errored encoded data may include header information indicative of location(s) of one or more error bits due to known memory defects (e.g., known defective memory cells in the memory device 314). The known-errored encoded data may be data that was retrieved in a similar manner as to how data may be provided to an NN (e.g., NN 56). For example, the known errored-encoded data may be data that was retrieved from a memory having known memory defects. Using the known-errored encoded data, an NN may be trained on data, such that the NN may also use the same memory having memory defects, but can estimate a BER, once trained.

The known BER may be a calculated BER of the known codewords and the known error bits introduced into particular codewords, such that the known BER is a calculated BER of N bits of encoded data once retrieved from a memory. The known BER may include a calculation of error bits to non-error bits in the N bits of encoded data (e.g., using known codewords) and/or a comparison of the known L bits of input data (a1, a2, ... aL) to an output of decoded data. For example, a number of errors in known output data 28 (y1, y2, ... yL) may be counted to calculate of a known BER of the known L bits of input data (a1, a2, ... aL).

Block 706 may follow block 704. Block 706 recites "determining a set of weights that modifies the known errored-encoded data using the known BER." For example, a neural network, such as NN 56, may be trained using the known errored-encoded data and known BER received in block 704. The known BER may be compared with the known errored-encoded data received in block 704. Based on the comparison, the weights used to estimate a BER of the known errored-encoded data using the neural network may be evaluated as the set of weights.

The weights may be numerical values, which, when used by the neural network, allow the neural network to estimate a BER of encoded data based on the encoded data encoded with an encoding technique. The weights may be stored, for example, in the weights memory 118 of FIG. 1C or memory 145 of FIG. 2. In some examples, training may not be performed, and an initial set of weights may simply be provided to a neural network, e.g., based on training of another neural network.

In some examples, multiple sets of data pairs may be received (e.g., in block 704), with each set corresponding to data encoded with a different encoding technique. Accordingly, multiple sets of weights may be determined (e.g., in block 704), each set corresponding to a different encoding technique. For example, one set of weights may be determined which may be used to estimate a BER for data encoded in accordance with LDPC coding while another set of weights may be determined which may be used to estimate a BER for data encoded with BCH coding.

Block 708 may follow block 706. Block 708 recites "storing the set of weights in a memory." In some examples, a set of weights may be selected that is associated with the particular encoding technique used to encode the data received in block 704. The set of weights may be stored in a memory (e.g., memory 118 of FIG. 1C) for selection from among multiple available sets of weights, each for use in estimating a BER of encoded data, e.g., based on a stored version of encoded data and in accordance with its respective encoding technique.

In some examples, blocks 704-708 may be repeated for data encoded with different encoding techniques. For example, known data may be received in block 704, encoded with one particular encoding technique (e.g., LDPC coding) and a known errored-encoded data pair associated with that known encoded data. A set of weights may be selected that is for use with LDPC coding and provided to a neural network for determining weights in block 706. Additional known data may then be received in block 704, encoded with a different encoding technique (e.g., BCH coding) and additional known errored-encoded data pair associated with that known encoded data. Another set of weights may be selected that is for use with BCH coding and provided to a neural network for determining weights in block 706. In this manner, one neural network may be trained to estimate a BER of encoded data based on data encoded with multiple encoding techniques.

The blocks included in the described example methods 600 and 700 are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus comprising:
   an encoder configured to provide encoded data including codewords encoded in accordance with an encoding technique having a coding rate for the codewords;
   a memory configured to store the encoded data;
   a processing resource comprising a neural network and configured to receive, from the memory, a stored version of the encoded data including at least one error bit among the codewords, wherein the processing resource is configured to, using the neural network, estimate a bit error rate (BER) of the stored version of the encoded data based on the stored version of the encoded data including the at least one error bit among the codewords.

2. The apparatus of claim 1, wherein the estimated BER is representative of an estimate of a BER of the stored version of the encoded data including the at least one error bit among the codewords as compared to the encoded data including the codewords that the encoder provided.

3. The apparatus of claim 1, wherein the at least one error bit comprises a flipped bit due to noise introduced by the memory.

4. The apparatus of claim 1, wherein the processing resource further comprises:
   an additional neural network and is configured to receive the stored version of the encoded data including the at least one error bit based on a comparison of the estimated BER with a threshold, and wherein the additional neural network further configured to mix the stored version of the encoded data with an additional set of predetermined weights selected for error reduction of data retrieved from the memory, wherein the additional neural network is further configured to generate an error-reduced version of the encoded data; and
   an error-correction code decoder configured to receive the error-reduced version of the encoded data and to provide decode data based on the error-reduced version of the encoded data.

5. The apparatus of claim 1, wherein the neural network comprises:
   a first stage of circuitry configured to receive the encoded data, to combine the stored version of the encoded data with a first set of predetermined weights, and to evaluate at least one non-linear function using combinations of the stored version of the encoded data and delayed versions of the combinations of the stored version of the encoded data to provide intermediate data; and
   at least a second stage of circuitry configured to receive the intermediate data and combine the intermediate data using a second set of predetermined weights to calculate the BER,
   wherein the first and second sets of predetermined weights were trained based on codewords associated with the encoding technique having the coding rate.

6. The apparatus of claim 5, further comprising a computer-readable media in communication with the first stage of circuitry and the second stage of circuitry, the computer-readable media configured to store multiple sets of predetermined weights, including the first and second sets of predetermined weights.

7. The apparatus of claim 5, wherein the first and second sets of predetermined weights are based on training of a neural network on known encoded data including known codewords encoded in accordance with the encoding technique and delayed versions of combinations of the known encoded data including the known codewords.

8. The apparatus of claim 7, wherein the neural network is trained to estimate a BER of the known encoded data.

9. The apparatus of claim 5, wherein the first stage of circuitry comprises a first plurality of multiplication/accumulation units, the first plurality of multiplication/accumulation units each configured to multiply at least one bit of the encoded data with at least one of the first set of predetermined weights and sum multiple weighted bits of the encoded data.

10. The apparatus of claim 9, wherein the first stage of circuitry further comprises a first plurality of memory lookup units (MLUs), the first plurality of each configured to retrieve at least one intermediate data value corresponding to an output of a respective one of the first plurality of multiplication/accumulation units based on the at least one non-linear function.

11. The apparatus of claim 9, wherein the first stage of circuitry further comprises a plurality of delay units configured to provide the delayed versions of the combinations of the encoded data based on the intermediate data provided by the first plurality of MLUs.

12. The apparatus of claim 1, wherein the estimated BER is equivalent to a bit error rate of the memory in operation.

13. A method comprising:
receiving, at a computing device that comprises a neural network, codewords encoded in accordance with an encoding technique having a coding rate and a bit error rate (BER);
determining, for the neural network, a set of weights that causes the neural network to estimate the BER of the codewords.

14. The method of claim 13, wherein the encoding technique comprises Reed-Solomon coding, Bose-Chaudhuri-Hocquenghem (BCH) coding, low-density parity check (LDPC) coding, Polar coding, or combinations thereof, and wherein the coding rate defines a ratio of data bits in the codewords to redundant bits in the codewords.

15. The method of claim 13, further comprising:
receiving, from a memory of the computing device, data encoded in accordance with the encoding technique;
estimating, at the neural network, a BER of the data encoded with the encoding technique using the set of weights.

16. A method comprising:
mixing encoded data including codewords encoded in accordance with an encoding technique received at a processing unit with a plurality of coefficients, the plurality of coefficients specific to the encoding technique, wherein mixing the encoded data comprises:
mixing, at a first layer of multiplication/accumulation processing units (MAC units) of a plurality of MAC units, the encoded data and delayed versions of respective outputs of the first layer of MAC units with certain of the plurality of coefficients to generate first processing results;
mixing, at additional layers of MAC units of the plurality of MAC units, the first processing results and delayed versions of at least a portion of the first processing results with others of the plurality of coefficients to generate second processing results; and
estimating the BER for the encoded data including the codewords encoded in accordance with an encoding technique based on the second processing results, such that the estimated BER is representative of an estimate of a BER of the encoded data when retrieved from a memory that stored the encoded data.

17. The method of claim 16, wherein mixing the encoded data received at the processing unit using the plurality of coefficients further comprises:
delaying, at respective delay units associated with the first layer of MAC units, the respective outputs of the first layer of MAC units to generate the delayed versions of the respective outputs of the first layer of MAC units.

18. The method of claim 16, wherein calculating, at the first layer of multiplication/accumulation processing units (MAC units) of the plurality of MAC units, the encoded data and the delayed versions of the respective outputs of the first layer of MAC units with the plurality of coefficients comprises:
multiplying the encoded data and the delayed versions of the respective outputs of the first layer of MAC units with respective coefficients of the plurality of coefficients to generate the first processing results.

19. The method of claim 16, further comprising:
obtaining, at the processing unit, encoded data from a memory coupled to the processing unit, including an indication from a touchscreen of a mobile communication device that the encoding technique was utilized.

20. The method of claim 16, wherein the encoding technique comprises a coding rate that defines a ratio of data bits in the codewords encoded in accordance with the encoding technique to redundant bits in the codewords.

21. The method of claim 16, wherein the codewords encoded in accordance with the encoding technique comprises at least one error hit among the codewords.

* * * * *

UNITED STATES PATENT AND TRADEMARK OFFICE
CERTIFICATE OF CORRECTION

PATENT NO. : 11,755,408 B2
APPLICATION NO. : 17/496703
DATED : September 12, 2023
INVENTOR(S) : Luo et al.

It is certified that error appears in the above-identified patent and that said Letters Patent is hereby corrected as shown below:

In the Claims

| Column | Line | Claim | Reads | Should read |
|---|---|---|---|---|
| 31 | 22 | 10 | the first plurality of each configured | the first plurality of MLUs each configured |
| 32 | 52 | 21 | comprises at least one error hit among the codewords. | comprises at least one error bit among the codewords. |

Signed and Sealed this
Fourteenth Day of November, 2023

*Katherine Kelly Vidal*
*Director of the United States Patent and Trademark Office*